United States Patent
Watanabe et al.

(10) Patent No.: US 9,946,435 B2
(45) Date of Patent: Apr. 17, 2018

(54) CONTROL DEVICE, CONTROL METHOD, AND ELECTRONIC APPARATUS TO CONTROL MOVEMENT OF A CURSOR

(71) Applicant: SONY CORPORATION, Tokyo (JP)

(72) Inventors: Takuo Watanabe, Tokyo (JP); Ikuo Yamano, Tokyo (JP); Shinpei Kameoka, Tokyo (JP); Masao Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/573,816

(22) Filed: Dec. 17, 2014

(65) Prior Publication Data

US 2015/0185877 A1    Jul. 2, 2015

(30) Foreign Application Priority Data

Dec. 27, 2013    (JP) .................................. 2013-272937

(51) Int. Cl.
| | | |
|---|---|---|
| *G06F 3/033* | (2013.01) | |
| *G06F 3/0481* | (2013.01) | |
| *G06F 3/0488* | (2013.01) | |
| *H04N 5/44* | (2011.01) | |
| *H04N 21/422* | (2011.01) | |

(52) U.S. Cl.
CPC ........ *G06F 3/04812* (2013.01); *G06F 3/0488* (2013.01); *H04N 5/4403* (2013.01); *H04N 21/42224* (2013.01)

(58) Field of Classification Search
CPC .. G06F 3/0354; G06F 3/0488; G06F 3/04812; H04N 5/4403
USPC .......................................... 345/158
See application file for complete search history.

(56) References Cited

U.S. PATENT DOCUMENTS

| | | | | |
|---|---|---|---|---|
| 6,020,876 A | * | 2/2000 | Rosenberg | G06F 3/011 345/157 |
| 2009/0077503 A1 | * | 3/2009 | Sundstrom | G06F 3/04812 715/856 |
| 2014/0306897 A1 | * | 10/2014 | Cueto | G06F 3/04883 345/173 |
| 2014/0340323 A1 | * | 11/2014 | Jang | G06F 3/0416 345/173 |

FOREIGN PATENT DOCUMENTS

JP    2003-223265 A    8/2003

* cited by examiner

*Primary Examiner* — Towfiq Elahi
(74) *Attorney, Agent, or Firm* — Chip Law Group

(57) ABSTRACT

A control device includes a control unit that displays a first cursor which discretely moves in response to an operation of a user and a second cursor which changes continuously on a display screen.

17 Claims, 20 Drawing Sheets

FIG. 1
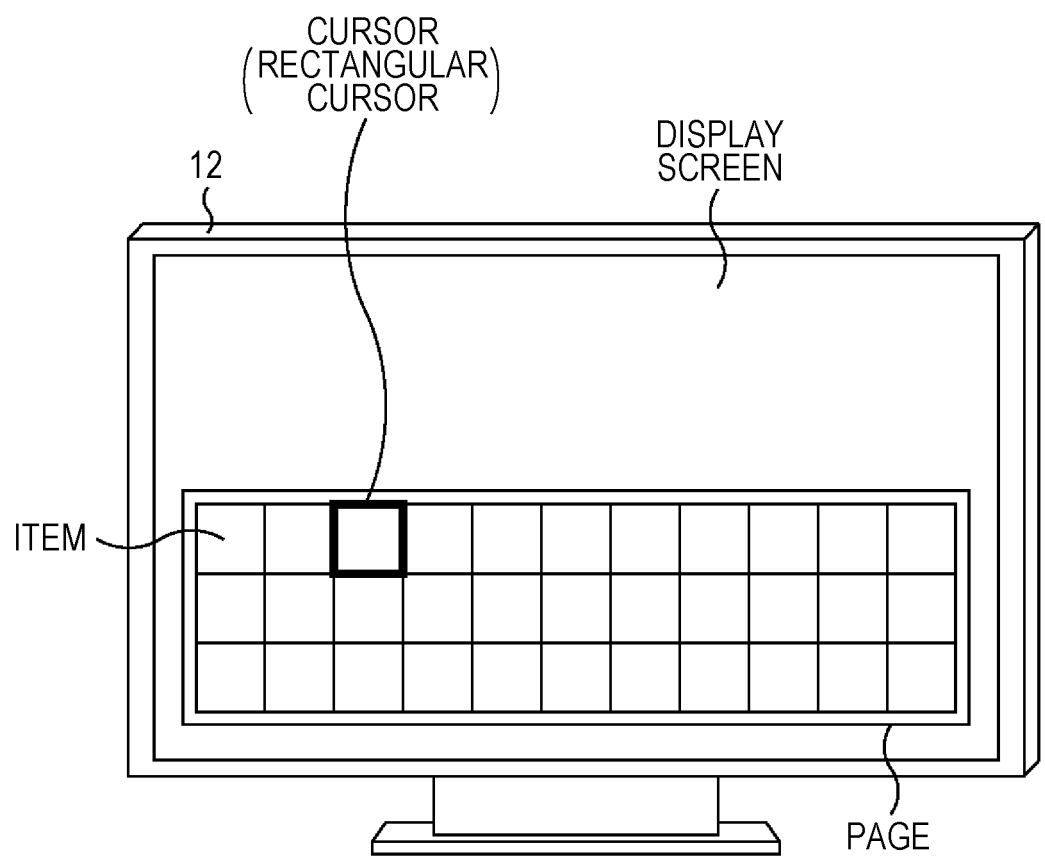
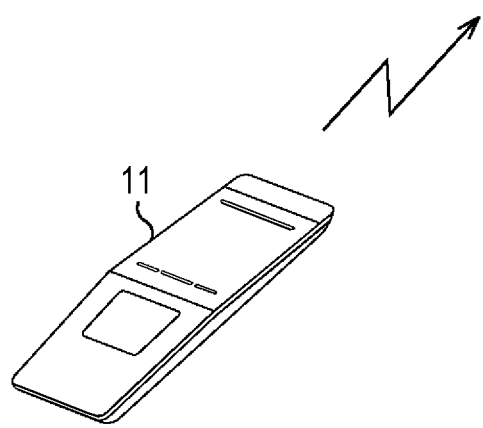

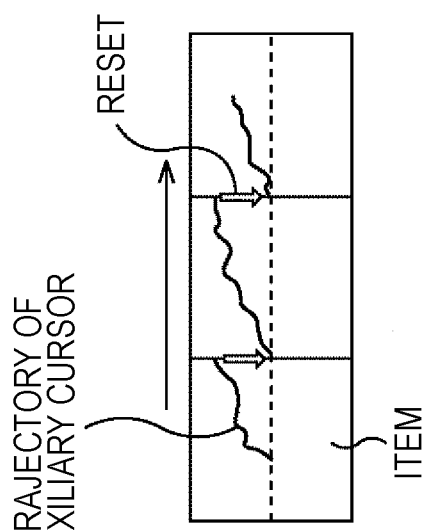
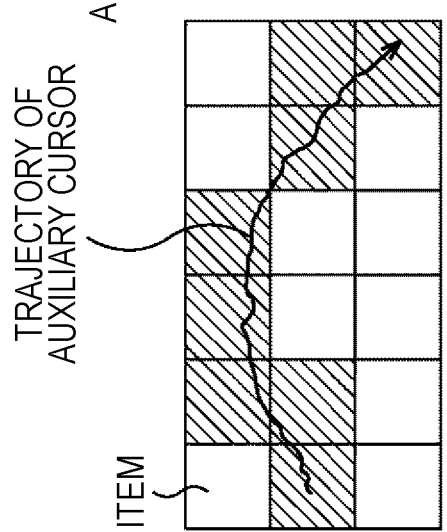

FIG. 15
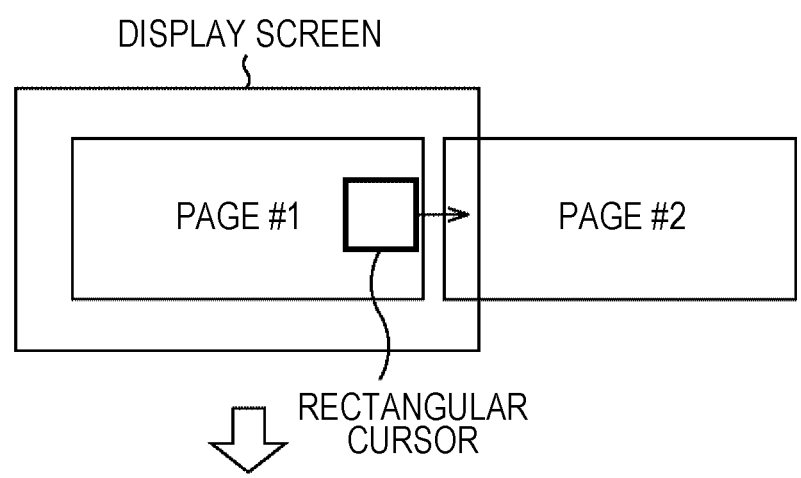
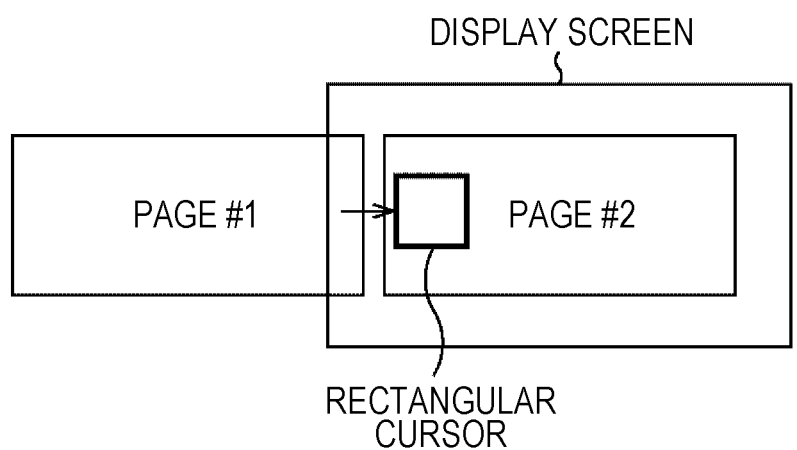

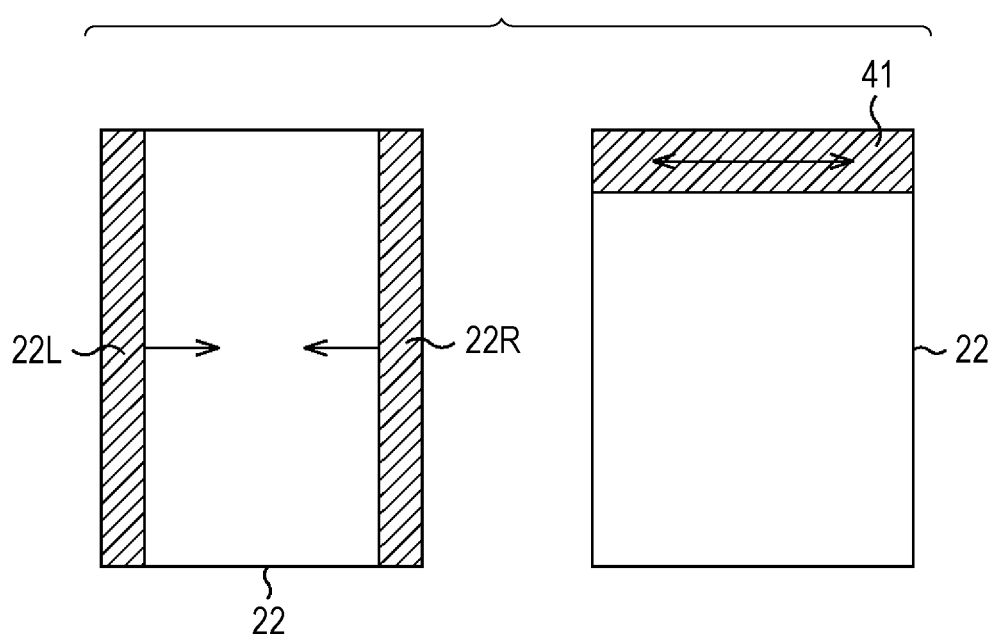

CONTROL DEVICE, CONTROL METHOD, AND ELECTRONIC APPARATUS TO CONTROL MOVEMENT OF A CURSOR

CROSS REFERENCE TO RELATED APPLICATIONS

This application claims the benefit of Japanese Priority Patent Application JP 2013-272937 filed Dec. 27, 2013, the entire contents of which are incorporated herein by reference.

BACKGROUND

The present technology relates to a control device, a control method, a program, and an electronic apparatus, and particularly to a control device, a control method, a program, and an electronic apparatus in which a cursor can be easily operated, for example, by a remote controller and the like on which sensors such as a touchpad, a joystick, a gyro, and the like are mounted.

Regarding a remote controller that remotely controls, for example, a television receiver (TV), a technology is proposed in which a user can easily recognize functions assigned to each button of the remote controller (for example, Japanese Unexamined Patent Application Publication No. 2003-223265)

SUMMARY

Incidentally, the cursor is difficult to be operated when the cursor displayed in an electronic apparatus such as a TV is operated by a remote controller and the like. It is desirable that the cursor be able to be easily operated.

According to an embodiment of the present technology, there are provided a control device and a program. The control device includes a control unit that displays a first cursor which discretely moves in response to an operation of a user and a second cursor which changes continuously on a display screen. The program causes a computer to function as the control device.

According to another embodiment of the present technology, there is provided a control method including displaying a first cursor that discretely moves in response to an operation of a user and a second cursor that changes continuously on a display screen.

In the control device, the control method, and the program, the first cursor that discretely moves in response to the operation of the user and the second cursor that changes continuously are displayed on the display screen.

According to still another embodiment of the present technology, there is provided an electronic apparatus including a reception unit that receives an operation signal which is transmitted from a remote controller and corresponds to an operation of a user and a control unit that displays a first cursor which discretely moves in response to the operation signal and a second cursor which changes continuously on a display screen.

In the electronic apparatus, the operation signal that is transmitted from the remote controller and corresponds to the operation of the user is received, and the first cursor which discretely moves in response to the operation signal and the second cursor which changes continuously are displayed on the display screen.

The control device may be an independent device or may be an internal block that constitutes one device. The program may be provided by being transferred via a transfer medium or being recorded in a recording medium.

According to the present technology, a cursor can be easily operated. The effect described here is not necessarily limited and may be any effect described in the present disclosure.

BRIEF DESCRIPTION OF THE DRAWINGS

FIG. 1 is a perspective view illustrating a configuration example of an embodiment of a TV system to which the present technology is applied;

FIGS. 9A to 9C are diagrams illustrating an example of correcting the position of the auxiliary cursor;

FIG. 15 is a diagram illustrating an example of page switching;

FIG. 18 is a diagram illustrating an example of a method for performing page switching without being dependent on the position of the rectangular cursor;

DETAILED DESCRIPTION OF EMBODIMENTS

Embodiment of a TV System to Which the Present Technology Is Applied.

FIG. 1 is a perspective view illustrating a configuration example of an embodiment of a TV system to which the present technology is applied.

The TV system includes a remote controller 11 and a TV 12 in FIG. 1. The remote controller 11 is operated by a user and transmits an operation signal that corresponds to an operation of the user. Transmitting the operation signal by the remote controller 11 may be performed through any method between wired communication and wireless communication.

In a case of transmitting the operation signal by the remote controller 11 through wireless communication, for example, infrared communication, wireless local area network (LAN), Bluetooth (registered trademark), or any other communication methods can be adopted as the wireless communication.

The TV 12 receives contents of a television broadcast, contents that are reproduced in external devices, contents that are transmitted via networks such as the Internet, and the like, displays images of the contents on a display screen, and outputs audio. In addition, the TV 12 displays a cursor and an item that is selected by the cursor as a graphical user interface (GUI) on a display screen when necessary.

For example, menu items on a menu screen, icons as symbols of contents, and the like are exemplified as the item displayed in the TV 12. When multiple items exist as the item displayed in the TV 12, the multiple items can be divided into multiple pages, and the items can be displayed for each page on the TV 12.

In the present embodiment, displays that change the luminance, the color, the shape (including the size), and the like of an item so that the user can recognize that the item is focused are included in the cursor besides images that are explicitly displayed as the cursor such as an arrow, a rectangle (the frame thereof), and the like.

The TV 12 receives the operation signal transmitted from the remote controller 11 and performs various processes in response to the operation signal. That is, the TV 12, for example, changes the channel for selecting a station that is selected and volume in response to the operation signal from the remote controller 11.

In addition, the TV 12, for example, changes the state of the cursor such as movement and the like of the cursor in response to the operation signal from the remote controller 11. Furthermore, the TV 12, for example, switches (changes) the page displayed on the display screen when items are displayed across the multiple pages in response to the operation signal from the remote controller 11.

Configuration Example of the Exterior of the Remote Controller 11

Figure 2:
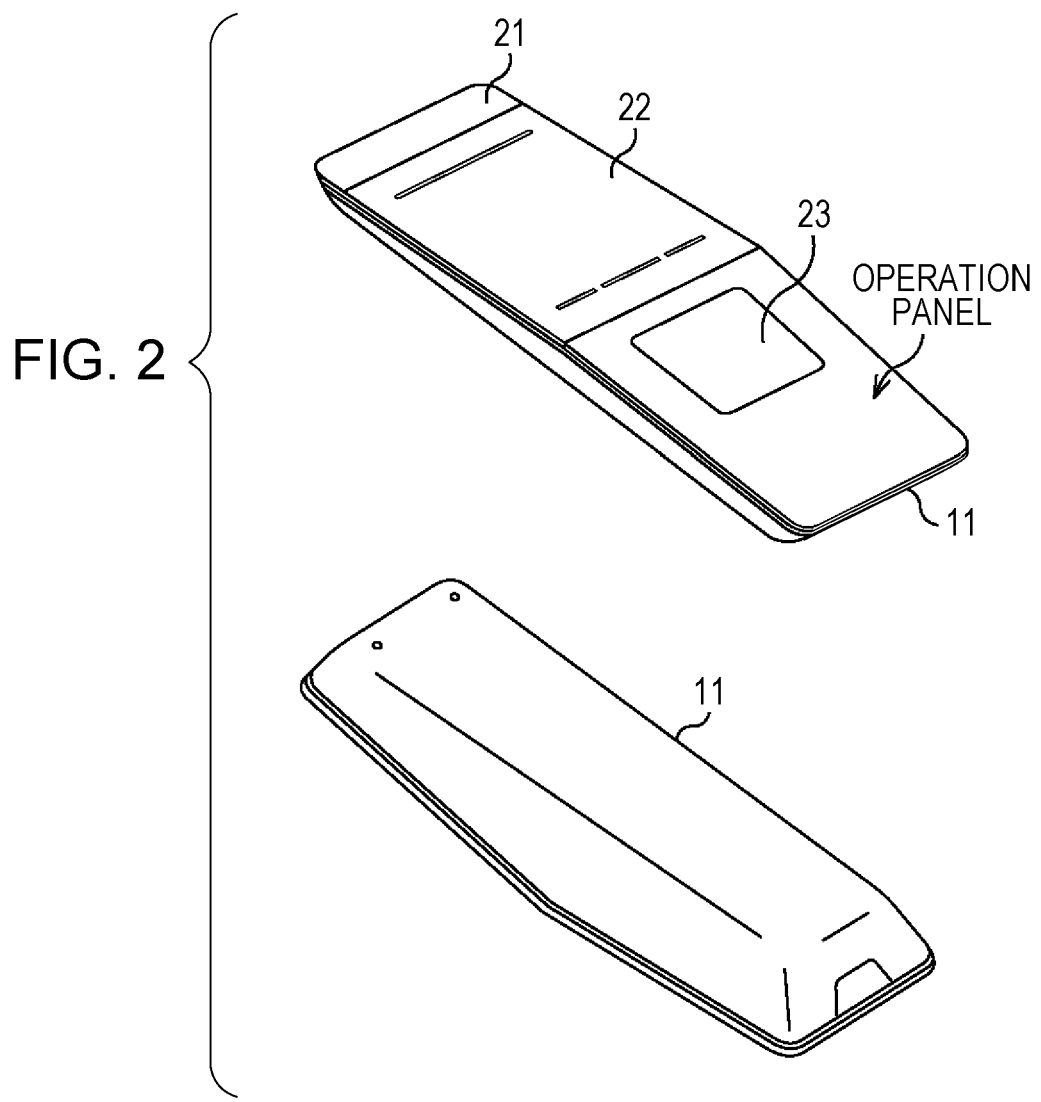
FIG. 2 is a perspective view illustrating a configuration example of the exterior of a remote controller.

FIG. 2 is a perspective view illustrating a configuration example of the exterior of a remote controller 11 in FIG. 1.

The remote controller 11 is shaped like a rectangular parallelepiped and a substantially flat plate A hard key unit 21, a touchpad 22, and a hard key unit 23 that are operated by the user are disposed on one surface of the flat plate as the remote controller 11.

The surface of the remote controller 11 where the hard key unit 21, the touchpad 22, and the hard key unit 23 that are operated by the user are disposed is hereinafter referred to as an operation panel. Each of the state of the remote controller 11 where the operation panel faces upward and the state of the remote controller 11 where the operation panel faces downward is illustrated in FIG. 2.

Figure 3:
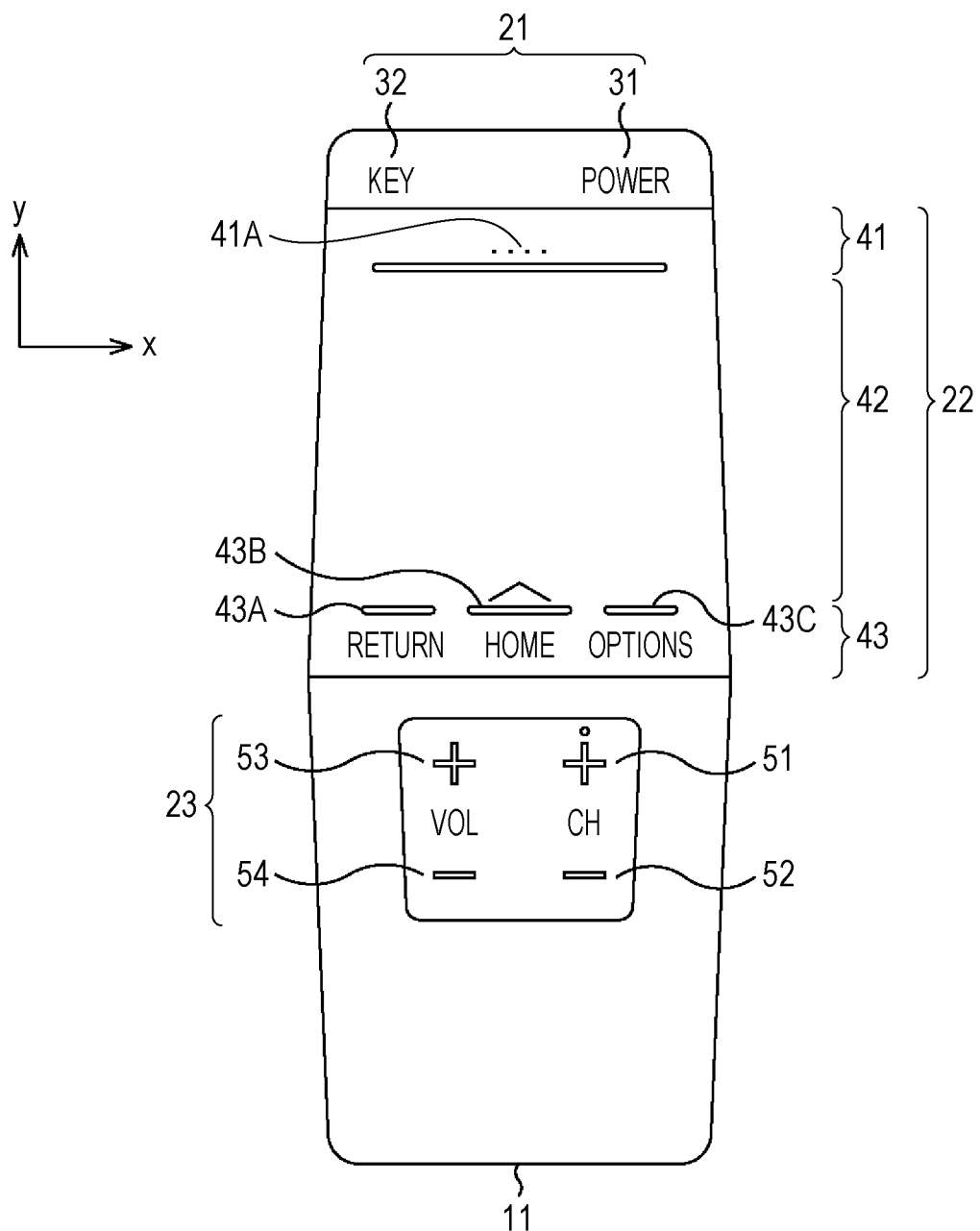
FIG. 3 is a plan view illustrating a configuration example of an operation panel of the remote controller.

FIG. 3 is a plan view illustrating a configuration example of an operation panel of the remote controller 11.

Hard keys 31 and 32 are disposed in the hard key unit 21.

The hard key 31 is a power key. The power of the TV 12 is ON or OFF when the hard key 31 is operated.

The hard key 32 is a special key. The TV 12 performs a predetermined process when the hard key 32 is operated.

The touchpad 22 is operated when moving the cursor displayed in the TV 12 or in other various cases.

In FIG. 3, the touchpad 22 is shaped like a substantial trapezoid and is sectioned into an area 41 on the upper base side (upper portion) of the trapezoid, an area 43 on the lower base side (lower portion), and an area 42 in the center portion interposed between the areas 41 and 43.

The TV 12, for example, changes the channel for selecting a station in a way that the channel number increases to be greater than the current channel number when the area 41 is operated by a swipe from the right to the left in the horizontal direction (x direction).

The TV 12, for example, changes the channel for selecting a station in a way that the channel number decreases to be smaller than the current channel number when the area 41 is operated by a swipe from the left to the right.

In addition, the touchpad 22 can be pushed to be operated. The TV 12, for example, displays the remote controller (the image thereof) for controlling the TV 12 on the display screen when an area 41A at the center of the area 41 is pushed to be operated (when a push operation is performed on the touchpad 22 while the area 41A is being touched). The remote controller can be displayed when an arbitrary position in the area 41 is pushed to be operated besides when the area 41A is pushed to be operated.

The area 42 is swiped to be operated when moving the cursor displayed in the TV 12 and the like. That is, the cursor displayed in the TV 12, for example, moves in response to a swipe operation in the area 42 when the area 42 is swiped to be operated.

In addition, the TV 12, for example, performs the same process as that in a case where a so-called decision key is operated when the area 42 is pushed to be operated (when a push operation is performed on the touchpad 22 while the area 42 is being touched). Furthermore, the TV 12, for example, performs the same process as that in a case where a so-called cursor key is operated when the area 42 is flicked to be operated.

The area 43 is sectioned into three areas 43A, 43B, and 43C in the horizontal direction. The TV 12, for example, performs the same process (process of returning to the previous state) as that in a case where a so-called return key is operated when the area 43A is pushed to be operated.

The TV 12, for example, performs the same process (process of displaying a home screen) as that in a case where a so-called home key is operated when the area 43B is pushed to be operated. The TV 12, for example, displays a broadcast selection screen for selecting a broadcast on the display screen when the area 43B is swiped to be operated in the vertically upward direction (y direction).

The TV 12, for example, performs the same process (for example, a process of displaying an option menu) as that in a case where a so-called option key is operated when the area 43C is pushed to be operated.

Hard keys 51, 52, 53, and 54 are disposed in the hard key unit 23.

The hard key 51, for example, is operated when incrementing the channel for selecting a station in the TV 12.

The hard key 52, for example, is operated when decrementing the channel for selecting a station in the TV 12.

The hard key 53, for example, is operated when increasing volume in the TV 12. The hard key 54, for example, is operated when decreasing volume in the TV 12.

Electrical Configuration Example of the Remote Controller 11 and the TV 12

Figure 4:
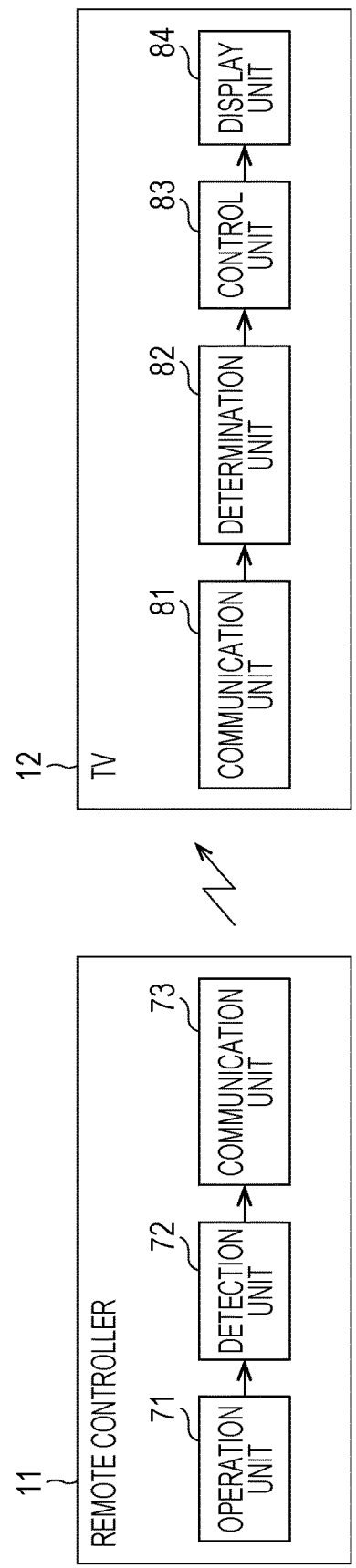
FIG. 4 is a block diagram illustrating an electrical configuration example of the remote controller and a TV.

FIG. 4 is a block diagram illustrating an electrical configuration example of the remote controller 11 and the TV 12 in FIG. 1.

The remote controller 11 includes an operation unit 71, a detection unit 72, and a communication unit 73.

The operation unit 71 corresponds to the hard key unit 21, the touchpad 22, and the hard key unit 23 (FIG. 2) and is operated by the user.

The detection unit 72 detects the operation of the operation unit 71 by the user and supplies the operation signal corresponding to the operation to the communication unit 73.

The communication unit 73 wirelessly transmits the operation signal from the detection unit 72.

The TV 12 includes a communication unit 81, a determination unit 82, a control unit 83, and a display unit 84.

The communication unit 81 receives the operation signal transmitted from the remote controller 11 (the communication unit 73 thereof) and supplies the operation signal to the determination unit 82.

The determination unit 82 determines the operation of the remote controller 11 by the user on the basis of the operation signal from the communication unit 81 and supplies the determination result and the operation signal from the communication unit 81 to the control unit 83.

The control unit 83 controls the entire TV 12 in response to the detection result of the operation by the user and the operation signal from the determination unit 82. That is, the control unit 83, for example, controls the channel, volume, and the like in response to the determination result of the operation by the user and the operation signal from the determination unit 82.

In addition, the control unit 83, for example, controls the display of the cursor and items in the display unit 84 in response to the detection result of the operation by the user and the operation signal from the determination unit 82.

The display unit 84, for example, is configured of a liquid crystal display (LCD), an organic electroluminescence (EL) display, or the like and displays images of contents, items, and the cursor according to the control and the like of the control unit 83 on the display screen.

Display of the Cursor when Selecting an Item Using a Discrete Point Cursor

Figure 5:
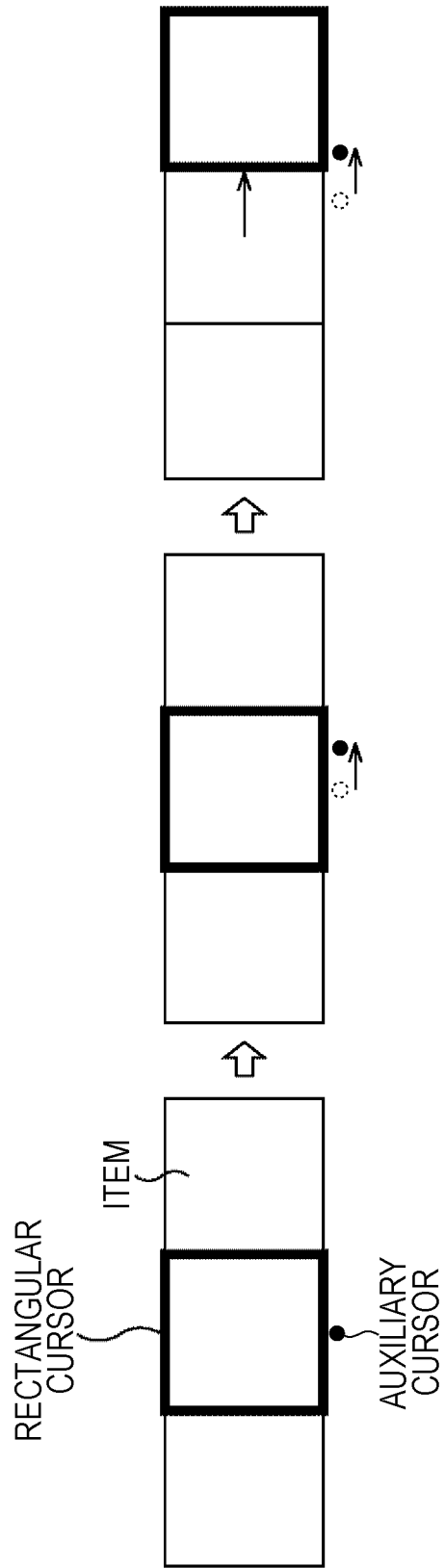
FIG. 5 is a diagram illustrating an example of displaying a cursor in the TV when selecting an item using a discrete point cursor.

FIG. 5 is a diagram illustrating an example of displaying a cursor in the TV 12 when selecting an item using a discrete point cursor.

In FIG. 5, multiple items are displayed on the display screen (of the display unit 84) in the form of being lined up in the horizontal direction as a one-dimensional direction by the control unit 83. Furthermore, in FIG. 5, a rectangular cursor and an auxiliary cursor are displayed on the display screen by the control unit 83.

In FIG. 5, the rectangular cursor is a cursor shaped like a rectangular frame and discretely moves only to the position of an item so as to surround the item in response to the operation of the remote controller 11. Here, when referring to the discretely moving cursor (first cursor) as a discrete point cursor, the rectangular cursor is the discrete point cursor.

In FIG. 5, the auxiliary cursor is a cursor shaped like a point and continuously moves (the position as the state of the auxiliary cursor changes continuously) in response to the operation of the remote controller 11. Here, when referring to the continuously moving cursor (second cursor) as a free point cursor, the auxiliary cursor is the free point cursor.

In FIG. 5, the auxiliary cursor is displayed under the rectangular cursor as a position close to the rectangular cursor that selects items lined up in the horizontal direction.

The rectangular cursor is (discretely) moved to the adjacent item (the position thereof) from a currently selected item (the position thereof) in a direction of a swipe operation by the control unit 83, for example, when the touchpad 22 (the area 42 thereof) of the remote controller 11 is swiped to be operated by a predetermined amount (or greater) in the horizontal direction.

The control unit 83 can ignore a component orthogonal to the horizontal direction in which items are lined up among directional components of a swipe operation on the touchpad 22 when items are lined up only in the one-dimensional horizontal direction as illustrated in FIG. 5.

In this case, the control unit 83 moves the rectangular cursor and the auxiliary cursor only in response to the component in the horizontal direction in which items are lined up as a valid component among components of a swipe operation on the touchpad 22.

Accordingly, the rectangular cursor and the auxiliary cursor only move in the one-dimensional direction (horizontal direction in FIG. 5) in which items are lined up when the items are only one-dimensionally lined up, and the component orthogonal to the horizontal direction in which the items are lined up is ignored among the components of a swipe operation on the touchpad 22.

As described above, a swipe operation on the touchpad 22 may be difficult to be performed if the auxiliary cursor does not exist when the touchpad 22 is swiped to be operated by a predetermined amount in the horizontal direction, and the rectangular cursor is moved to the adjacent item from the currently selected item.

That is, the rectangular cursor is moved when the touchpad 22 is swiped to be operated by a predetermined amount in the horizontal direction, but with only the rectangular cursor, it is difficult for a user to recognize the extent to perform a swipe operation to move the rectangular cursor. As a consequence, the user performs a swipe operation with uncertainties.

In the present embodiment, the auxiliary cursor that is the free point cursor is displayed besides the rectangular cursor that is the discrete point cursor. The auxiliary cursor continuously moves in response to a swipe operation by the user on the touchpad 22 since the auxiliary cursor is the free point cursor.

That is, the auxiliary cursor that is the free point cursor continuously moves in response to a swipe operation on the touchpad 22 even when the amount of the swipe operation on the touchpad 22 does not reach a predetermined amount, and the rectangular cursor that is the discrete point cursor does not move.

When items are lined up only in the one-dimensional horizontal direction, the auxiliary cursor, for example, is displayed at a position under the rectangular cursor corresponding to the center (center of mass) of the rectangular cursor (position bisecting the rectangular cursor in the horizontal direction) as the initial position thereof and thereafter, (continuously) moves in the horizontal direction in response to a swipe operation when the touchpad 22 is swiped to be operated.

In FIG. 5, the rectangular cursor is displayed at the position of the second item from the left among three items lined up in the horizontal direction, and the auxiliary cursor is displayed at the position under the rectangular cursor corresponding to the center of the rectangular cursor as the initial position thereof. In addition, in FIG. 5, the auxiliary cursor moves to the right from the initial position in response to the swipe operation to the right on the touchpad 22.

The determination unit 82 determines whether the amount of movement (amount of change) of the auxiliary cursor with the center of the rectangular cursor as a reference, for example, exceeds half the width of the rectangular cursor in the transverse direction (horizontal direction) as a threshold corresponding to the size of the rectangular cursor (hereinafter, also referred to as a movement threshold).

The control unit 83 moves the rectangular cursor to the item positioned in the direction of movement (direction of change) of the auxiliary cursor from the currently selected item as illustrated in FIG. 5 when the amount of movement of the auxiliary cursor with the center of the rectangular cursor as a reference exceeds the movement threshold. As described above, the rectangular cursor (first cursor) and the auxiliary cursor (second cursor) collaborate (cooperate) with each other to move.

In FIG. 5, the amount of movement of the auxiliary cursor by the swipe operation to the right on the touchpad 22 exceeds the movement threshold. Thus, the rectangular cursor moves to the position of the third (right end) item from the second item from the left among three items lined up in the horizontal direction.

In this case, the amount of the swipe operation on the touchpad 22 is represented as the amount of movement of the auxiliary cursor with the center of the rectangular cursor as a reference, and both ends (left end and right end) of the rectangular cursor are used as the threshold of the amount of movement of the auxiliary cursor when the rectangular cursor is moved. Thus, the user can recognize the extent of the swipe operation that allows the rectangular cursor to move by the auxiliary cursor.

Furthermore, the auxiliary cursor continuously moving in response to the swipe operation by the user allows the user to be able to receive visual feedback with respect to the swipe operation and to be able to recognize that a process with respect to the swipe operation is being performed. As a consequence, the user can easily operate the rectangular cursor without feeling uncertainties such as "Does the rectangular cursor move by the swipe operation?", and "When does the rectangular cursor move?".

Figure 6:
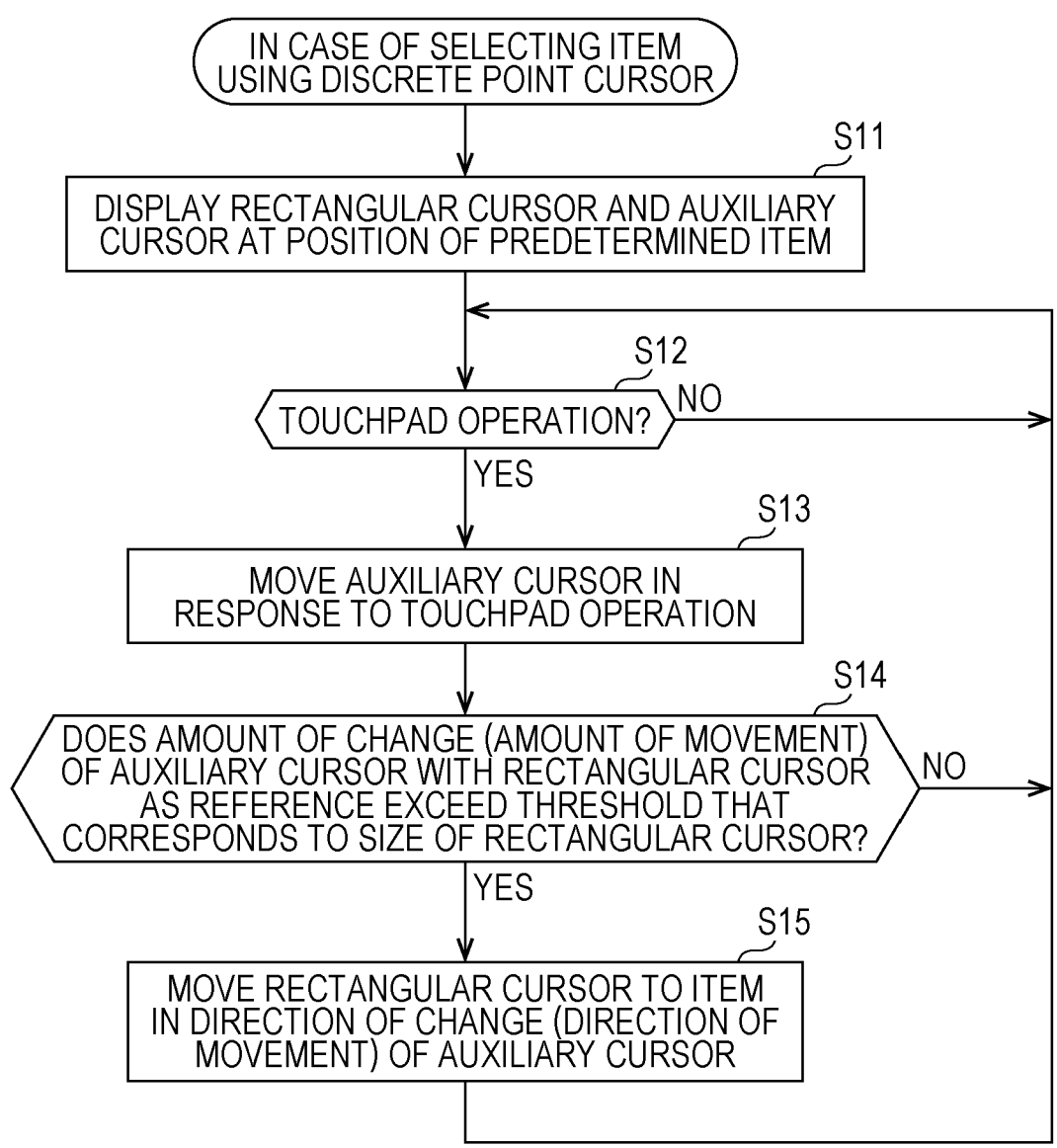
FIG. 6 is a flow chart illustrating an example of a process of the TV when selecting an item using the discrete point cursor.

FIG. 6 is a flow chart illustrating an example of a process of the TV 12 when selecting an item using the rectangular cursor as the discrete point cursor as described above.

The control unit 83 displays multiple items lined up in the one-dimensional horizontal direction and displays the rectangular cursor and the auxiliary cursor at the position of a predetermined item among the multiple items on the display screen in step S11. The process proceeds to step S12.

The auxiliary cursor, for example, is displayed at the initial position with the rectangular cursor as a reference, that is, the position under the rectangular cursor corresponding to the center of the rectangular cursor (position bisecting the rectangular cursor in the horizontal direction).

In step S12, the determination unit 82 determines whether the touchpad 22 (the area 42 thereof) is swiped to be operated on the basis of the operation signal supplied from the communication unit 81. The process returns to step S12 when the touchpad 22 is determined not to be swiped to be operated in step S12.

The process proceeds to step S13 when the touchpad 22 is determined to be swiped to be operated in step S12. The control unit 83 moves the auxiliary cursor in response to the amount of the swipe operation on the touchpad 22, and the process proceeds to step S14.

In step S14, the determination unit 82 determines whether the amount of movement (amount of change) of the auxiliary cursor with the rectangular cursor as a reference, for example, exceeds half the width of the rectangular cursor in the transverse direction as the movement threshold that is the threshold corresponding to the size of the rectangular cursor on the basis of the operation signal supplied from the communication unit 81.

The process returns to step S12 when the amount of movement of the auxiliary cursor with the rectangular cursor as a reference is determined to exceed the movement threshold in step S14.

The process proceeds to S15 when the amount of movement of the auxiliary cursor with the rectangular cursor as a reference is determined to exceed the movement threshold in step S14. The control unit 83 moves the rectangular cursor to the item positioned in the direction of movement (direction of change) of the auxiliary cursor. Then, the process returns to step S12 from step S15, and thereafter, the same process is repeated.

The auxiliary cursor, for example, can be displayed only during the swipe operation on the touchpad 22. In this case, the user can recognize that the swipe operation is functioning on the touchpad 22. In addition, the auxiliary cursor may not be displayed when, for example, the remote controller 11 includes a cursor key as a hard key, and the cursor key is operated.

When the rectangular cursor is moved by operating (pushing) the cursor key, the rectangular cursor is generally moved to the item in a direction corresponding to the pushed cursor key by pushing the cursor key because the auxiliary cursor that represents the amount of the swipe operation on the touchpad 22 is not necessary to be displayed.

Furthermore, the user can be prevented from perceiving operating the cursor key as operating the auxiliary cursor by not displaying the auxiliary cursor during operating the cursor key. The above description is also applied to a flick operation on the area 42 of the touchpad 22 that is equivalent to the cursor key operation.

Figure 7:
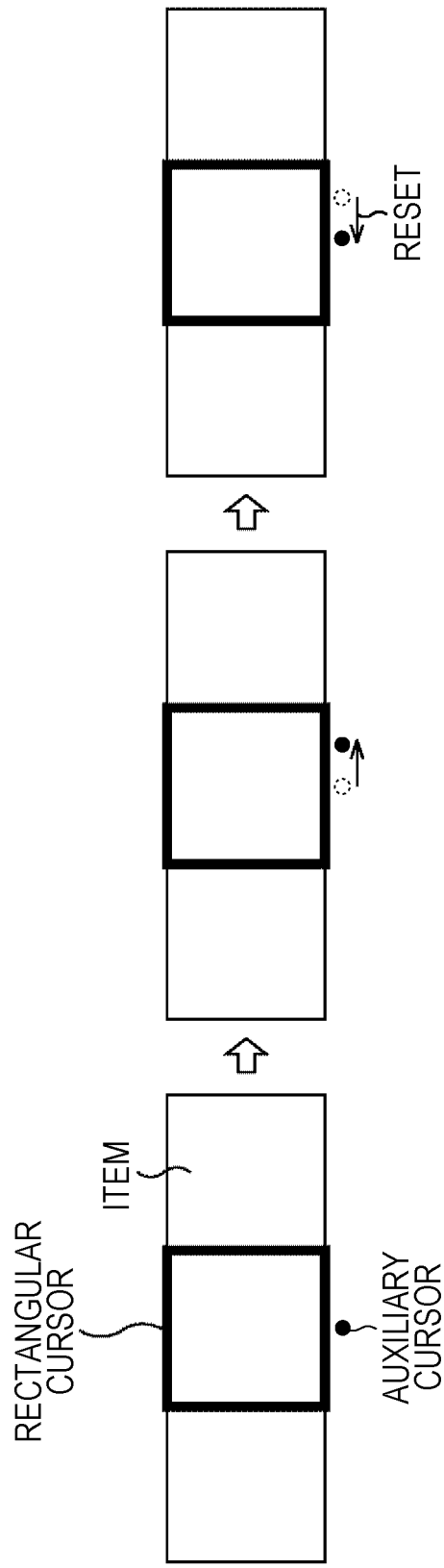
FIG. 7 is a diagram illustrating an example of resetting an auxiliary cursor.

FIG. 7 is a diagram illustrating an example of resetting the auxiliary cursor.

The control unit 83 can reset the auxiliary cursor (with the rectangular cursor as a reference) to the initial state thereof with a predetermined event as a trigger. That is, the auxiliary cursor can be reset to move to the initial position in response to a predetermined event. The predetermined event that resets the auxiliary cursor here is also referred to as a reset event.

In FIG. 7, like in the case in FIG. 5, the auxiliary cursor moves to the right within a range not exceeding the movement threshold in response to the swipe operation to the right on the touchpad 22.

Thereafter, some reset event occurs, and the auxiliary cursor is reset to move to the initial position. As the reset event, for example, movement of the rectangular cursor can be adopted.

When the auxiliary cursor is reset by movement of the rectangular cursor as the reset event, the rectangular cursor can be moved with the same amount of the operation (the same amount of movement of the auxiliary cursor (half the width of the rectangular cursor in the transverse direction))

by a swipe operation to any direction between the left and the right after the rectangular cursor is moved.

When the auxiliary cursor is not reset after the rectangular cursor is moved, the rectangular cursor, for example, is moved to the left to return to the original position of the item with a slight amount of operation when a swipe operation is performed to the left immediately after the rectangular cursor is moved to the right by a swipe operation to the right on the touchpad 22. Accordingly, the rectangular cursor may move to the left against the intention of the user when the auxiliary cursor is not reset after the rectangular cursor is moved.

Resetting the auxiliary cursor using movement of the rectangular cursor as the reset event can prevent the rectangular cursor from moving against the intention of the user as described above and further can relieve the user from uncertainties such as the unintended movement of the rectangular cursor.

Besides movement of the rectangular cursor, for example, events such as the user stopping contact with (touching) the touchpad 22 (for example, when the finger used in operating the touchpad 22 is separated from the touchpad 22), the user not operating the touchpad 22 continuously for a predetermined time period, and the user reversing the direction of a swipe operation can be adopted as the reset event.

The display of the rectangular cursor and the auxiliary cursor above can also be applied to a case where items are lined up in the vertical direction or any other one-dimensional direction besides the case where multiple items are lined up in the horizontal direction as a one-dimensional direction on the display screen.

Furthermore, the display of the rectangular cursor and the auxiliary cursor can also be applied to a case where multiple items, for example, are lined up in the horizontal direction and the vertical direction as a two-dimensional direction (or further in a case where items are three-dimensionally (3D) displayed by adding the depth direction) on the display screen.

Figure 8:
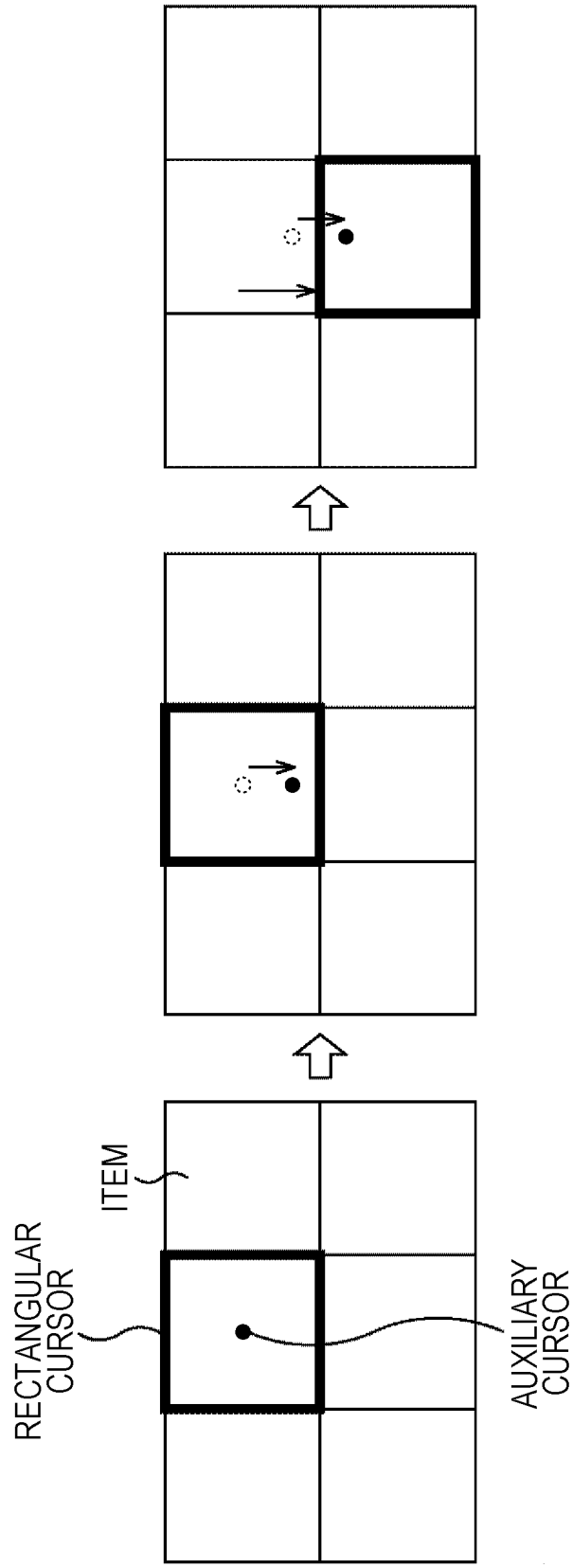
FIG. 8 is a diagram illustrating an example of displaying the cursor in the TV when selecting an item using a rectangular cursor as the discrete point cursor.

FIG. 8 is a diagram illustrating an example of displaying the cursor in the TV 12 when selecting an item that is lined up in a two-dimensional direction using the rectangular cursor as the discrete point cursor.

In FIG. 8, multiple items are displayed on the display screen in the form of being lined up in both the horizontal direction and the vertical direction as a two-dimensional direction by the control unit 83.

Furthermore, in FIG. 8, the rectangular cursor and the auxiliary cursor are displayed on the display screen by the control unit 83.

As described in FIG. 5, the rectangular cursor discretely moves only to the position of an item so as to surround the item in response to the operation of the remote controller 11, and the auxiliary cursor continuously moves in response to the operation of the remote controller 11.

In FIG. 8, the auxiliary cursor is displayed inside the rectangular cursor (inside the frame as the rectangular cursor) as a position close to the rectangular cursor.

As illustrated in FIG. 8, the rectangular cursor and the auxiliary cursor move in the horizontal direction in response to the horizontal component among components of the swipe operation on the touchpad 22, and the rectangular cursor and the auxiliary cursor move in the vertical direction in response to the vertical component among the components of the swipe operation by the control unit 83 when items are two-dimensionally lined up in both the horizontal direction and the vertical direction.

Furthermore, the auxiliary cursor is displayed at the center (center of mass) of the rectangular cursor as the initial position when items are two-dimensionally lined up. The auxiliary cursor moves in the horizontal direction and the vertical direction (arbitrary two-dimensional direction) in response to the swipe operation when the touchpad 22 is swiped to be operated.

In FIG. 8, the rectangular cursor is displayed at the position of the item that is the first from the top and the second from the left among three×two items where three×two is the number of columns×the number of rows (in the horizontal direction×the vertical direction), and the auxiliary cursor is displayed at the center of the rectangular cursor as the initial position.

In addition, in FIG. 8, the auxiliary cursor moves downward from the initial position in response to the swipe operation downward on the touchpad 22.

The determination unit 82 determines the amount of movement (amount of change) of the auxiliary cursor in each of the horizontal direction and the vertical direction like in the case in FIG. 5.

That is, regarding the horizontal direction, the determination unit 82 determines whether the amount of movement of the auxiliary cursor with the rectangular cursor (the center thereof) as a reference, for example, exceeds half the width of the rectangular cursor in the transverse direction as the movement threshold corresponding to the size of the rectangular cursor (in the horizontal direction)

Similarly, regarding the vertical direction, the determination unit 82 determines whether the amount of movement of the auxiliary cursor with the rectangular cursor as a reference, for example, exceeds half the width of the rectangular cursor in the perpendicular direction as the movement threshold corresponding to the size of the rectangular cursor (in the vertical direction).

The control unit 83 moves the rectangular cursor to the item positioned in the direction of movement (direction of change) of the auxiliary cursor as the horizontal direction and the vertical direction from the currently selected item when the amount of movement of the auxiliary cursor with the rectangular cursor as a reference exceeds the movement threshold.

In FIG. 8, the amount of movement of the auxiliary cursor by the swipe operation downward on the touchpad 22 exceeds the movement threshold. Thus, the rectangular cursor moves to the position of the item downward, that is, the second from the top and the second from the left among three×two items.

As described above, even in the case where items are two-dimensionally lined up, like in the case where items are one-dimensionally lined up in FIG. 5, the amount of the swipe operation on the touchpad 22 is represented as the amount of movement of the auxiliary cursor with the rectangular cursor as a reference, and both ends of the left and the right and both ends of the top and the bottom of the rectangular cursor are used as the threshold of the amount of movement of the auxiliary cursor when the rectangular cursor is moved. Thus, the user can recognize the extent of the swipe operation that allows the rectangular cursor to move by the auxiliary cursor. As a consequence, the rectangular cursor can be easily operated.

FIGS. 9A to 9C are diagrams illustrating an example of correcting the position of the auxiliary cursor.

As described in FIG. 2 and FIG. 3, when the user holds and operates the remote controller 11 shaped like a rectangular parallelepiped and a substantially flat plate in the hand, the user, for example, holds the remote controller 11 from the side surface (the left side surface or the right side surface of the remote controller 11 with the longitudinal direction thereof directed in the vertical direction (y direction) when the operation panel of the remote controller 11 is the front as illustrated in FIG. 3) and operates the touchpad 22 with the thumb.

Even though the user intends to swipe straightly in the horizontal direction or the vertical direction to operate the touchpad 22, the actual swipe operation is performed like drawing an arc when the user holds the remote controller 11 in the hand and operates the touchpad 22 with the thumb as described above.

FIG. 9A illustrates an example of the trajectory of movement of the auxiliary cursor in a swipe operation that is intended to be performed straightly in the horizontal direction.

In FIGS. 9A to 9C, the user performs a swipe operation in the horizontal direction to move the rectangular cursor (not illustrated in FIGS. 9A to 9C) from the left to the right in the second line of items from the top of items lined up two-dimensionally. However, the swipe operation of the user is performed like drawing an arc. Thus, the trajectory of movement of the auxiliary cursor is made in an arc in response to the swipe operation of the user.

Accordingly, the rectangular cursor also moves through the position of the items illustrated with hatching in FIG. 9A, having the trajectory like drawing an arc. The rectangular cursor not only moves in the second items from the top, but also moves up or down to the adjacent item regardless of the intention of the user to move the rectangular cursor from the left to the right in the second line of items from the top.

Operability of the rectangular cursor decreases when the rectangular cursor wobbles against the intention of the user like moving to the upper or lower item regardless of the intention of the user to move the rectangular cursor in the horizontal direction (from the left to the right in the second line of items from the top in FIGS. 9A to 9C) as described above.

The control unit 83 can correct the position of the auxiliary cursor by resetting the position (state) of the auxiliary cursor in a direction orthogonal to the direction of movement of the rectangular cursor to the initial position (initial state) when the rectangular cursor moves.

FIG. 9B illustrates an example of correcting the position of the auxiliary cursor when a swipe operation is performed in the horizontal direction.

In FIG. 9B, the amount of movement of the auxiliary cursor with the rectangular cursor as a reference exceeds the movement threshold, and the rectangular cursor moves to the item on the right side.

When the rectangular cursor moves to the item in the horizontal direction (right in FIG. 9B), the position of the auxiliary cursor in the vertical direction orthogonal to the horizontal direction, which is the direction of movement of the rectangular cursor, is reset to the center of the rectangular cursor as the initial position. Thus, the position of the auxiliary cursor is corrected as illustrated by arrows in FIG. 9B.

FIG. 9C illustrates an example of the trajectory of movement of the auxiliary cursor in a swipe operation that is intended to be performed straightly in the horizontal direction when the position of the auxiliary cursor is corrected as described above.

Correcting the position of the auxiliary cursor allows the rectangular cursor to be able to move through the position of the items lined up straightly in the horizontal direction as illustrated with hatching in FIG. 9C even though the swipe operation of the user in the horizontal direction is performed like drawing an arc.

Accordingly, correcting the position of the auxiliary cursor by resetting prevents the rectangular cursor from wobbling against the intention of the user. As a consequence, the rectangular cursor can be easily operated.

When the rectangular cursor moves in the horizontal direction, the position of the auxiliary cursor in the vertical direction orthogonal to the horizontal direction, which is the direction of movement of the rectangular cursor, is reset to the center of the rectangular cursor as the initial position as described above. In this case, the rectangular cursor can be prevented from wobbling up and down (in the vertical direction).

Meanwhile, when the rectangular cursor moves in the vertical direction, the position of the auxiliary cursor in the horizontal direction orthogonal to the vertical direction, which is the direction of movement of the rectangular cursor, is reset to the center of the rectangular cursor as the initial position. In this case, the rectangular cursor can be prevented from wobbling left and right (in the horizontal direction).

In the case described above, the point-shaped cursor (image) is adopted as the auxiliary cursor. However, any other cursors can be adopted as the auxiliary cursor.

Figure 10:
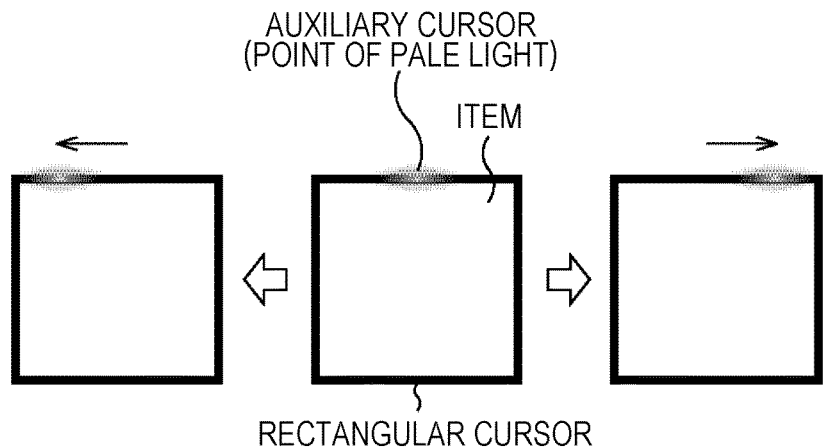
FIG. 10 is a diagram illustrating a first example of the auxiliary cursor.

FIG. 10 is a diagram illustrating a first example of the auxiliary cursor. In FIG. 10, a point of pale light that is spread like a disc shape is adopted as the auxiliary cursor.

In addition, in FIG. 10, items lined up one-dimensionally are displayed on the display screen in the horizontal direction. The point of light as the auxiliary cursor is displayed in the form of overlaying the upper edge of the rectangular cursor.

The point of light as the auxiliary cursor moves to the left in response to a swipe operation when the swipe operation is performed to the left and moves to the right in response to a swipe operation when the swipe operation is performed to the right.

Meanwhile, regarding the point of light as the auxiliary cursor, the width of the point of light can be widened at the position of the center of the rectangular cursor (the upper edge thereof). The width of the point of light can be narrowed as the point of light is positioned to the left or the right of the rectangular cursor.

When the width of the point of light is set to be consistent regardless of the position of the point of light on the rectangular cursor, the point of light stands out as the free point cursor. Thus, operational sensitivity may deteriorate.

On the contrary, the point of light can be prevented from standing out as the free point cursor, and seamless sensitivity and further operational sensitivity can be improved when moving the rectangular cursor by widening the width of the point of light at the position of the center of the rectangular cursor and narrowing the width of the point of light as the point of light is positioned to the left or the right of the rectangular cursor as described above.

Figure 11:
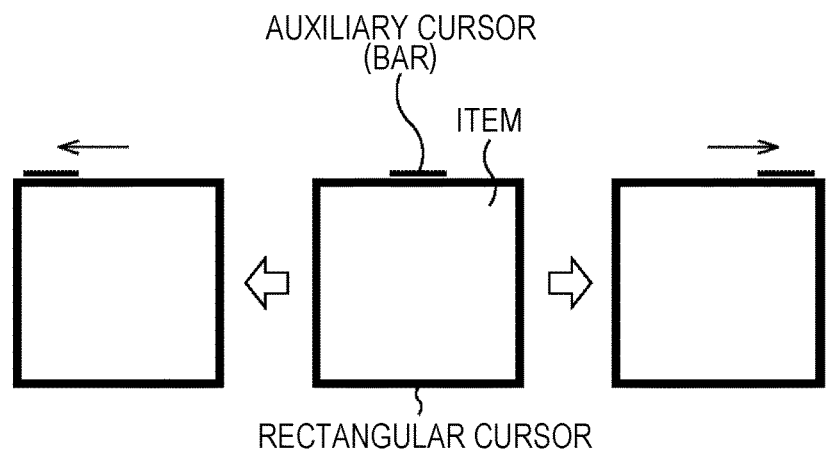
FIG. 11 is a diagram illustrating a second example of the auxiliary cursor.

FIG. 11 is a diagram illustrating a second example of the auxiliary cursor. A bar is adopted as the auxiliary cursor in FIG. 11.

In addition, in FIG. 11, items lined up one-dimensionally are displayed on the display screen in the horizontal direction. The bar as the auxiliary cursor is displayed in the form of being closely over the rectangular cursor.

The bar as the auxiliary cursor moves to the left in response to a swipe operation when the swipe operation is performed to the left and moves to the right in response to a swipe operation when the swipe operation is performed to the right.

Besides adopting cursors such as the point-shaped cursor, the point of light, and the bar above that are separate from the rectangular cursor, a cursor integrated with the rectangular cursor can be adopted as the auxiliary cursor.

Figure 12:
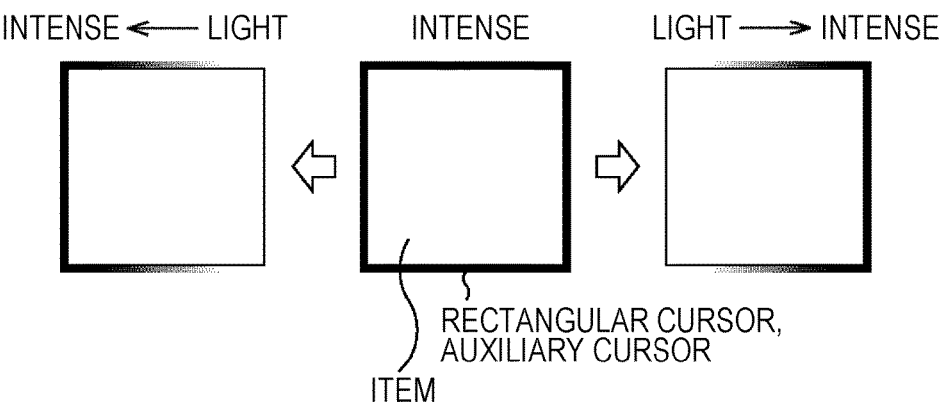
FIG. 12 is a diagram illustrating a first example of the auxiliary cursor integrated with the rectangular cursor.

FIG. 12 is a diagram illustrating a first example of the auxiliary cursor integrated with the rectangular cursor.

The color intensity of the frame of the rectangular cursor is functioning as the auxiliary cursor in FIG. 12.

The color intensity (intenseness) of the frame of the rectangular cursor as the auxiliary cursor is consistent (initial state) across the entire frame when a swipe operation is not performed (corresponding to when the point-shaped auxiliary cursor is at the initial position).

The color intensity of the frame of the rectangular cursor as the auxiliary cursor is more intense to the left side of the frame (lighter to the right side of the frame) when a swipe operation is performed to the left.

The color intensity of the frame of the rectangular cursor as the auxiliary cursor is more intense to the right side of the frame (lighter to the left side of the frame) when a swipe operation is performed to the right.

Figure 13:
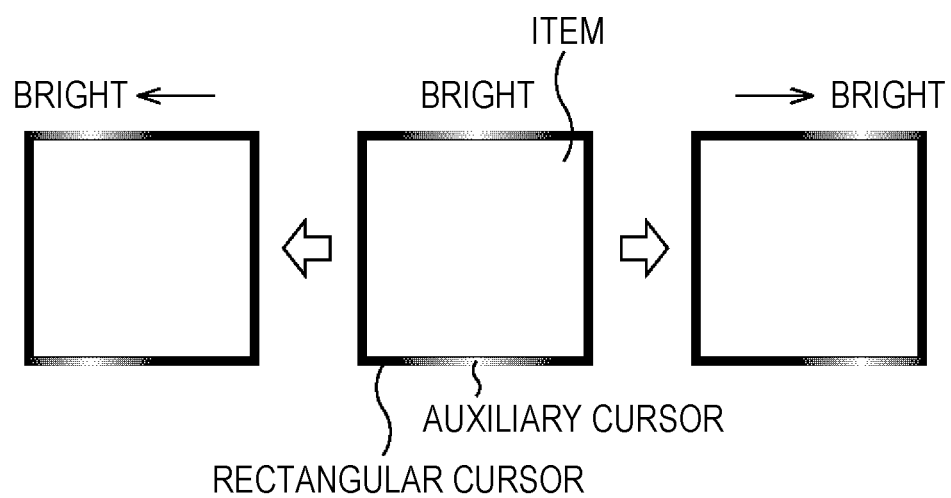
FIG. 13 is a diagram illustrating a second example of the auxiliary cursor integrated with the rectangular cursor.

FIG. 13 is a diagram illustrating a second example of the auxiliary cursor integrated with the rectangular cursor.

The luminance (brightness) of the frame of the rectangular cursor is functioning as the auxiliary cursor in FIG. 13.

The luminance of the center part between the left and the right of the frame of the rectangular cursor is greater (brighter) than the other part (initial state) when a swipe operation is not performed.

The part of the frame of the rectangular cursor where the luminance as the auxiliary cursor is great moves to the left when a swipe operation is performed to the left.

The part of the frame of the rectangular cursor where the luminance as the auxiliary cursor is great moves to the right when a swipe operation is performed to the right.

Figure 14:
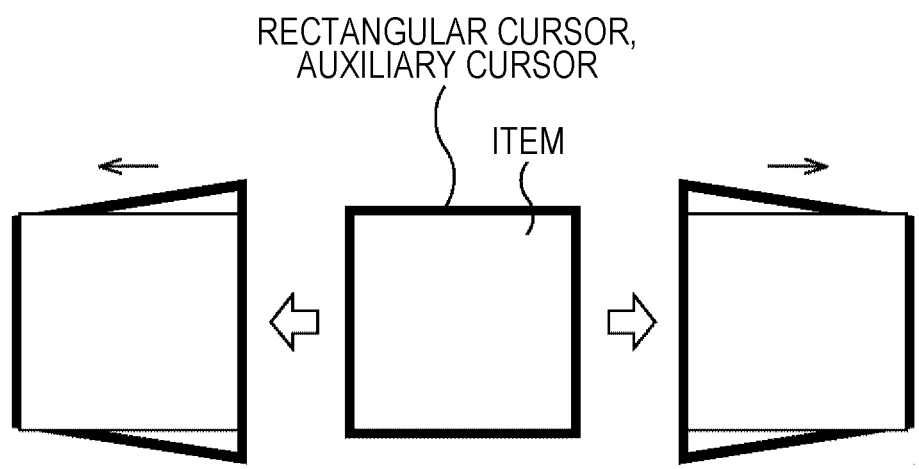
FIG. 14 is a diagram illustrating a third example of the auxiliary cursor integrated with the rectangular cursor.

FIG. 14 is a diagram illustrating a third example of the auxiliary cursor integrated with the rectangular cursor.

The inclination (shape) of the frame of the rectangular cursor is functioning as the auxiliary cursor in FIG. 14.

The inclination of the frame of the rectangular cursor as the auxiliary cursor is in a state where the frame faces the front (initial state) when a swipe operation is not performed.

The inclination of the frame of the rectangular cursor as the auxiliary cursor is in a state where the item surrounded by the frame seems to move to the item on the left side when a swipe operation is performed to the left.

The inclination of the frame of the rectangular cursor as the auxiliary cursor is in a state where the item surrounded by the frame seems to move to the item on the right side when a swipe operation is performed to the right.

As described above, a cursor integrated with the rectangular cursor can be used as the auxiliary cursor besides a cursor that is separate from the rectangular cursor.

The auxiliary cursor can be designed by adopting, for example, a design in accordance with the design and the like of the display screen when items are displayed on the display screen.

Moving the rectangular cursor achieves the aim to select an item. However, since the auxiliary cursor is a cursor that assists in achieving the aim, it is not preferable for the auxiliary cursor to stand out or to give the user an impression of operating the auxiliary cursor.

Adopting a cursor with a design that does not stand out or a cursor integrated with the rectangular cursor as the auxiliary cursor can prevent the auxiliary cursor from standing out and give the user less of an impression of operating the auxiliary cursor.

Page Switching

FIG. 15 is a diagram illustrating an example of page switching. Hereinafter, descriptions and illustrations of the auxiliary cursor will be omitted.

As described in FIG. 1, when multiple items exist as the item displayed in the TV 12, the multiple items can be divided into multiple pages, and the items can be displayed for each page on the TV 12.

Given that a page that is now displayed on the display screen is referred to as a current page, operating the remote controller 11 to move the rectangular cursor further to the left or the right than the item at the left end or the right end of the current page allows the control unit 83 to switch the current page to the previous (left side) page or the next (right side) page of the current page.

In FIG. 15, when a page #1 is the current page, the touchpad 22 is swiped to be operated to the right to move the rectangular cursor further to the right than the item at the right end of the current page. Thus, the current page is switched from the page #1 to the next page #2.

Switching the current page as described above without any restrictions thereon may cause the rectangular cursor to, so to say, excessively move further to the left or the right than the left end or the right end of the current page to switch the current page against the intention of the user when the user swipes to operate the touchpad 22 not to switch the current page but to select the item at the left end or the right end of the current page. Thus, switching the current page can be restricted in the TV 12 when necessary.

Figure 16A:
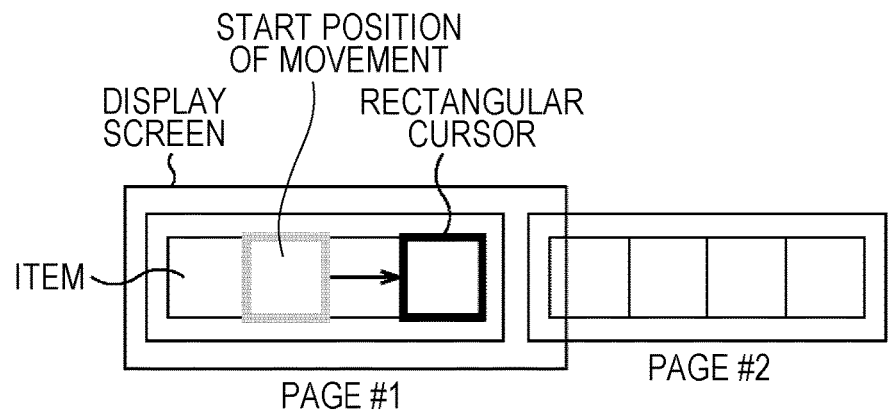
FIGS. 16A and 16B are diagrams illustrating an example of switching a current page in the TV.
Figure 16B:
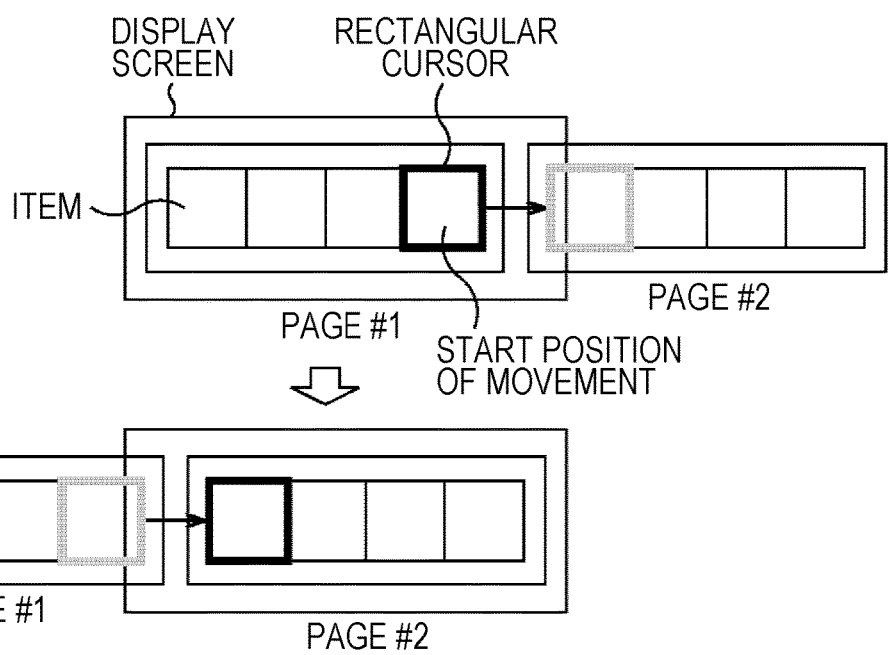

FIGS. 16A and 16B are diagrams illustrating an example of switching the current page in the TV 12.

The rectangular cursor that discretely moves to the position of an item and items selected by the rectangular cursor are displayed on the display screen in FIGS. 16A and 16B.

In addition, in FIGS. 16A and 16B, the pages #1 and #2 exist as the multiple pages where the items are arranged, and the page #1 is the current page.

FIG. 16A illustrates an example of movement of the rectangular cursor when the start position of movement of the rectangular cursor is not the position of the adjacent item adjacent to the adjacent page among the items in the current page. A swipe operation is now performed on the touchpad 22 to the right from the page #1 that is the current page toward the page #2 that is the adjacent page adjacent to the page #1.

In this case, the control unit 83 restricts the rectangular cursor to move up to the position of the adjacent item when the start position of movement of the rectangular cursor is the item adjacent to the (adjacent) page #2 in the right that is the direction of movement of the rectangular cursor among the items in the page #1 as the current page, that is, when the start position of movement of the rectangular cursor is not the position of the item at the right end of the page #1. The control unit 83 does not restrict the movement of the rectangular cursor when the start position of movement of the rectangular cursor is the position of the adjacent item (the item at the right end of the page #1).

In FIG. 16A, the start position of movement of the rectangular cursor is the position of the second item from the left among the items in the page #1 as the current page, not the position of the adjacent item (the item at the right end of the page #1) adjacent to the page #2 in the right that is the direction of movement of the rectangular cursor. Thus, the rectangular cursor is restricted to move up to the position of the item at the right end of the page #1 in response to the swipe operation to the right, and the rectangular cursor stops at the position of the item at the right end of the page #1.

FIG. 16B illustrates an example of movement of the rectangular cursor when the start position of movement of the rectangular cursor is the position of the adjacent item adjacent to the adjacent page (page #2) in the right that is the direction of movement of the rectangular cursor among the items in the current page.

In FIG. 16B, the start position of movement of the rectangular cursor is the position of the adjacent item (the item at the right end of the page #1) adjacent to the page #2 in the right that is the direction of movement of the rectangular cursor. Thus, the control unit 83 restricts the movement of the rectangular cursor.

That is, the control unit 83 switches the current page to the page #2 as the adjacent page in the right that is the direction of movement of the rectangular cursor in response to the swipe operation and moves the rectangular cursor to the position of the item in the page #2 as the current page after page switching that is adjacent to the page #1 as the current page before page switching, that is, to the position of the item at the left end of the page #2.

As described above, the control unit 83 switches a page only when the rectangular cursor is at the position of the item at the left end or the right end of the current page, and a swipe operation is started. The control unit 83 does not switch a page by restricting the rectangular cursor to move up to the position of the item at the left end or the right end of the current page when the rectangular cursor is not at the position of the item at the left end or the right end of the current item, and a swipe operation is started.

Accordingly, a page can be prevented from being switched against the intention of the user even when the user excessively swipes to operate the touchpad 22.

Furthermore, the user can perform a swipe operation without being anxious about a page being switched against the intention of the user and can move the rectangular cursor to the position of a desired item by continuously performing swipe operations without hesitation.

Here, pages are assumed to be lined up in the horizontal direction, and a page is switched in response to the movement of the rectangular cursor in the horizontal direction as a trigger that corresponds to a swipe operation in the horizontal direction. Besides, for example, pages can be assumed to be lined up in the vertical direction, and a page can be switched in response to the movement of the rectangular cursor in the vertical direction as a trigger that corresponds to a swipe operation in the vertical direction.

Figure 17:
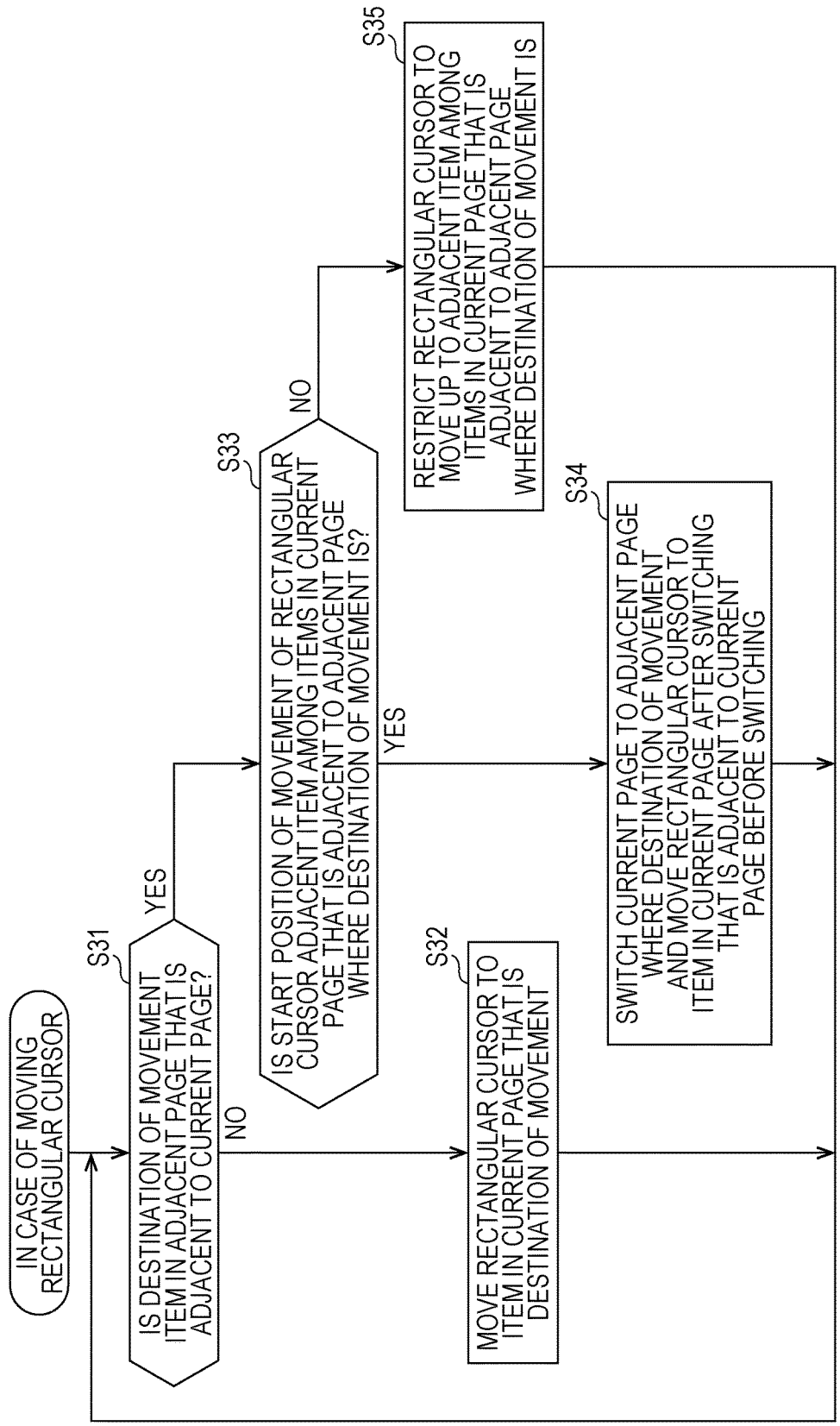
FIG. 17 is a flow chart illustrating an example of a process when the rectangular cursor is moved in response to a swipe operation on a touchpad.

FIG. 17 is a flow chart illustrating an example of a process when the rectangular cursor is moved in response to a swipe operation on the touchpad 22. Here, pages are lined up in the horizontal direction.

In step S31, the determination unit 82 determines whether the destination of movement of the rectangular cursor by a swipe operation is the item (the position thereof) in the adjacent page adjacent to the current page on the basis of the operation signal supplied from the communication unit 81.

The process proceeds to step S32 when the destination of movement of the rectangular cursor by the swipe operation is determined not to be the item in the adjacent page adjacent to the current page, that is, when the destination of movement of the rectangular cursor by the swipe operation is an item in the current page in step S31. The control unit 83 moves the rectangular cursor to the item (the position thereof) in the current page that is the destination of movement of the rectangular cursor by the swipe operation, and the process returns to step S31.

The process proceeds to step S33 when the destination of movement of the rectangular cursor by the swipe operation is determined to be the item in the adjacent page adjacent to the current page in step S31. The determination unit 82 determines whether the start position of movement of the rectangular cursor is the adjacent item adjacent to the adjacent page that is the destination of movement of the rectangular cursor among the items in the current page.

The process proceeds to step S34, and the page is switched when the start position of movement of the rectangular cursor is determined to be the adjacent item adjacent to the adjacent page that is the destination of movement of the rectangular cursor among the items in the current page, that is, for example, in a case where the rectangular cursor is at the item at the left end or the right end of the current page when a swipe operation is started to the left or the right in step S33.

In step S34, the control unit 83 switches the current page to the adjacent page that is the destination of movement of the rectangular cursor and moves the rectangular cursor to the position of the item in the current page after switching (the item at the right end or the left end of the current page after switching) adjacent to the current page before switching. Then, the process returns to step S31 from step S34, and thereafter, the same process is repeated.

Meanwhile, the process proceeds to step S35 when the start position of movement of the rectangular cursor is determined not to be the adjacent item adjacent to the adjacent page that is the destination of movement of the rectangular cursor among the items in the current page, that is, for example, in a case where the rectangular cursor is at an item other than the item at the left end or at an item other than the item at the right end of the current page when a swipe operation is started to the left or the right in step S33. The control unit 83 restricts the rectangular cursor to move up to the position of the item (the item at the left end or the right end of the current page) adjacent to the adjacent page that is the destination of movement of the rectangular cursor among the items in the current page and moves the rectangular cursor to the position of the item. Then, the process returns to step S31 from step S35, and thereafter, the same process is repeated.

In the case described above, the page can be switched when the rectangular cursor is at the position of the item at the left end or the right end of the current page, and a swipe operation is started to the left or the right. Besides, the page can be switched without being dependent on the position of the rectangular cursor.

FIG. 18 is a diagram illustrating an example of a method for performing page switching without being dependent on the position of the rectangular cursor.

That is, FIG. 18 is a plan view illustrating the touchpad 22 schematically.

As illustrated in FIG. 18, an area 22L that is a part of the touchpad 22 at the left end and an area 22R that is a part of the touchpad 22 at the right end are set for page switching. Page switching can be performed, for example, when the area 22L at the left end is swiped to be operated to the right to switch the current page to the left page (previous page) regardless of the position of the rectangular cursor.

Furthermore, page switching can be performed, for example, when the area 22R at the right end is swiped to be operated to the left to switch the current page to the right page (next page) regardless of the position of the rectangular cursor.

In addition, as illustrated in FIG. 18, an area 41 that is a part of the touchpad 22 at the upper end is set for page switching. Page switching can be performed, for example, when the area 41 is swiped to be operated to the right or the left to switch the current page to the left page (previous page) or the right page (next page) regardless of the position of the rectangular cursor.

As described above, page switching can be performed without moving the rectangular cursor up to the item at the left end or the right end of the current page when page switching is performed without being dependent on the position of the rectangular cursor. Thus, the number of operational moves necessary for page switching can decrease, and page switching can be performed quickly.

Figure 19A:
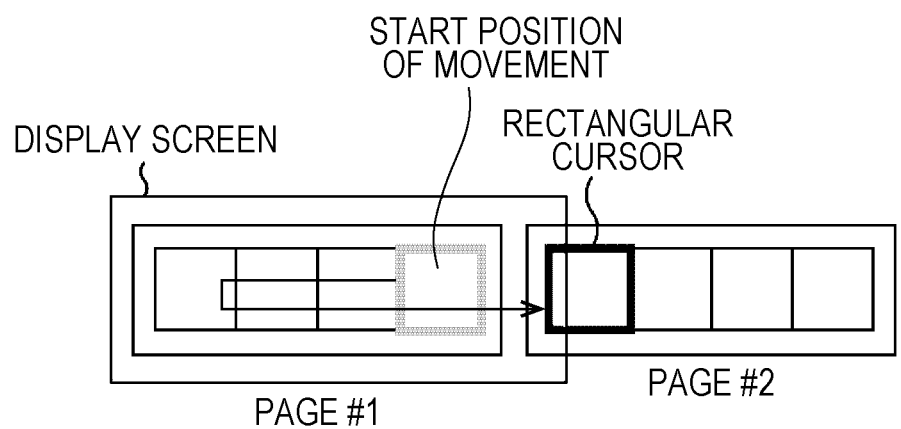
FIGS. 19A and 19B are diagrams illustrating an example of updating the start position of movement.
Figure 19B:
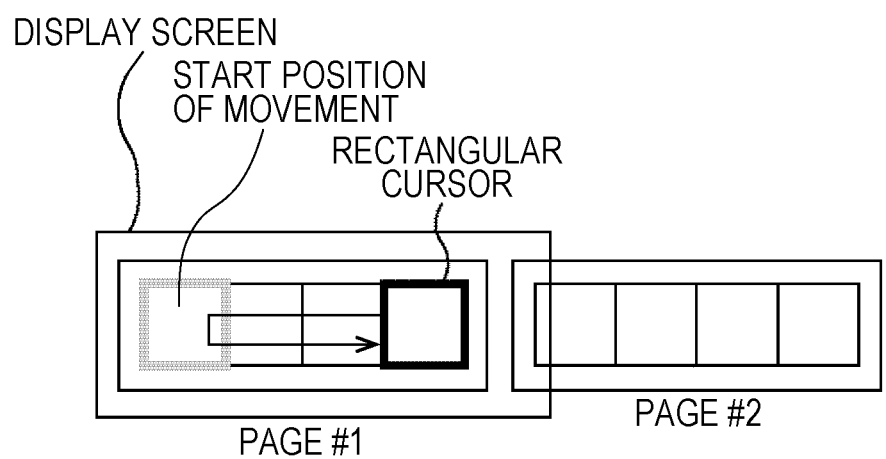

FIGS. 19A and 19B are diagrams illustrating an example of updating the start position of movement.

As described in FIGS. 16A and 16B, the rectangular cursor is restricted to move up to the adjacent item when the start position of movement of the rectangular cursor is not the position of the adjacent item adjacent to the adjacent page in the direction of movement of the rectangular cursor among the items in the current page, and the movement of the rectangular cursor is not restricted when the start position of movement of the rectangular cursor is the position of the adjacent item in the current page. However, even in these cases, page switching may be performed against the intention of the user when a swipe operation is performed like changing the direction of movement of the rectangular cursor.

FIG. 19A illustrates an example of page switching that occurs against the intention of the user when a swipe operation is performed like changing the direction of movement of the rectangular cursor.

In FIG. 19A, the start position of movement of the rectangular cursor is the position of the item at the right end of the page #1 that is the current page, and a swipe operation is performed to move the rectangular cursor to the left. Thereafter, a swipe operation is performed to change the direction of movement of the rectangular cursor from the left to the opposite right with the contact on the touchpad 22 not being released.

In this case, the start position of movement of the rectangular cursor is the item (the item at the right end of the page #1) adjacent to the page #2 that is the adjacent page in the right that is the direction of movement of the rectangular cursor among the items in the page #1 that is the current page. Thus, the movement of the rectangular cursor is not restricted, and page switching is performed to switch the current page from the page #1 to the page #2 by the swipe operation that moves the rectangular cursor to the right.

As described above, the start position of movement of the rectangular cursor is the position of the item at the right end of the page #1 that is the current page, and the user performs a swipe operation to move the rectangular cursor to the left. Thereafter, the user performs a swipe operation to change the direction of movement of the rectangular cursor from the left to the opposite right with the contact on the touchpad 22 not being released. However, for example as for that case, the user may change the direction of the swipe operation from the left to the right after performing a swipe operation to the left to move the rectangular cursor at the position of the item at the right end of the page #1 to the position of the item adjacent to the left because the amount of the swipe operation is excessively great.

The user does not intend to perform page switching in such a case to switch the current page from the page #1 to the page #2. Thus, page switching is desirably restricted.

The control unit 83 can restrict such page switching that occurs against the intention of the user described above by setting the start position of movement of the rectangular cursor to the position of the item where the direction of movement is changed when the direction of movement of the rectangular cursor is changed.

FIG. 19B illustrates an example of page switching when the start position of movement of the rectangular cursor is set to the position of the item where the direction of movement is changed when the direction of movement of the rectangular cursor is changed.

In FIG. 19B, the start position of movement of the rectangular cursor is the position of the item at the right end of the page #1 that is the current page, and a swipe operation is performed to move the rectangular cursor to the left. Thereafter, a swipe operation is performed to change the direction of movement of the rectangular cursor from the left to the opposite right with the contact on the touchpad 22 not being released.

In FIG. 19B, the direction of movement of the rectangular cursor is changed at the position of the item at the left end of the page #1 from the left to the opposite right. At this time, the control unit 83 sets (resets) the start position of movement of the rectangular cursor to the position of the item at the left end of the page #1 from the position of the item at the right end of the page #1.

In this case, the start position of movement of the rectangular cursor is the item at the left end of the page #1, not the item (the item at the right end of the page #1) adjacent to the page #2 that is the adjacent page in the right that is the direction of movement of the rectangular cursor among the items in the page #1. Thus, the rectangular cursor is restricted to move up to the position of the item (the item at the right end of the page #1) adjacent to the page #2 that is the adjacent page among the items in the page #1. As a consequence, page switching is not performed.

Accordingly, page switching can be prevented from being performed against the intention of the user when the user performs a swipe operation like changing the direction of movement of the rectangular cursor as described above.

Page switching can be performed without restricting the rectangular cursor to move up to the position of the adjacent item under a predetermined condition even when the start position of movement of the rectangular cursor is not the position of the adjacent item adjacent to the adjacent page in the direction of movement of the rectangular cursor among the items in the current page.

That is, page switching can be performed without restricting the rectangular cursor to move up to the position of the adjacent item when, for example, a flick operation other than a swipe operation is performed even though the start position of movement of the rectangular cursor is not the position of the adjacent item adjacent to the adjacent page in the direction of movement of the rectangular cursor among the items in the current page.

Incidentally, the user may not notice that pages other than the current page exist when multiple items are divided into multiple pages, and the items are displayed for each page in the TV 12.

The control unit 83 can display announcement information for announcing that the adjacent page exists on the display screen when the adjacent page adjacent to the current page exists.

The announcement information can be displayed corresponding to the position of the rectangular cursor in the current page or can be displayed regardless of the position of the rectangular cursor.

Figure 20:
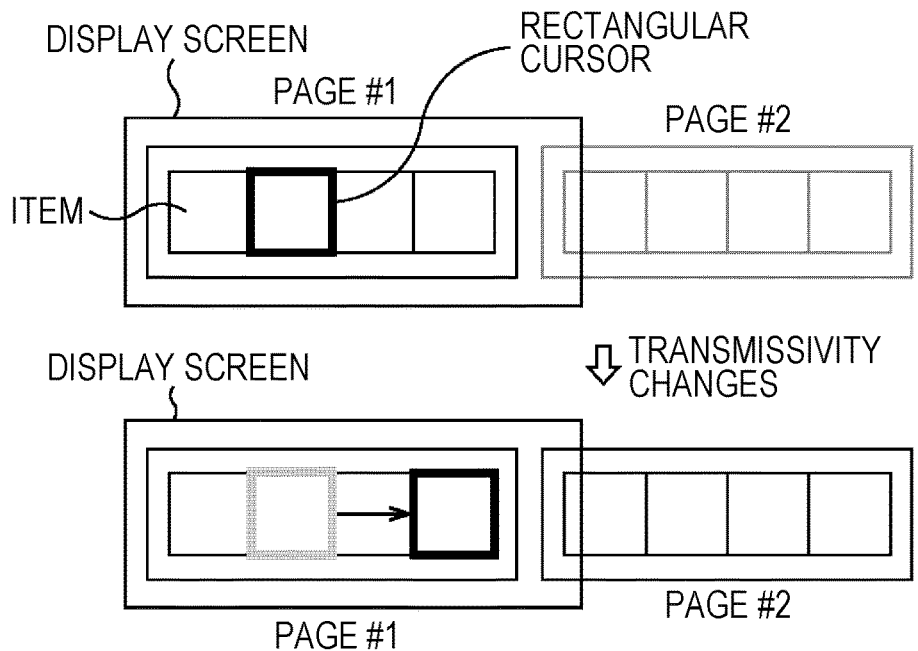
FIG. 20 is a diagram illustrating a first display example of announcement information.

FIG. 20 is a diagram illustrating a first display example of the announcement information. The pages #1 and #2 exist, and the page #1 is the current page in FIG. 20.

As illustrated in FIG. 20, displaying a part of the page #2 that is the adjacent page adjacent to the page #1 that is the current page in a partial view at an end of the display screen regardless of the position of the rectangular cursor can be adopted as a display of the announcement information.

Furthermore, as illustrated in FIG. 20, changing the transmissivity of the part of the page #2 in a partial view from a light state to an intense state when the rectangular cursor is positioned at the adjacent item (the item at the right end of the page #1) adjacent to the page #2 that is the adjacent page among the items in the page #1 that is the current page can be adopted as a display of the announcement information.

Figure 21:
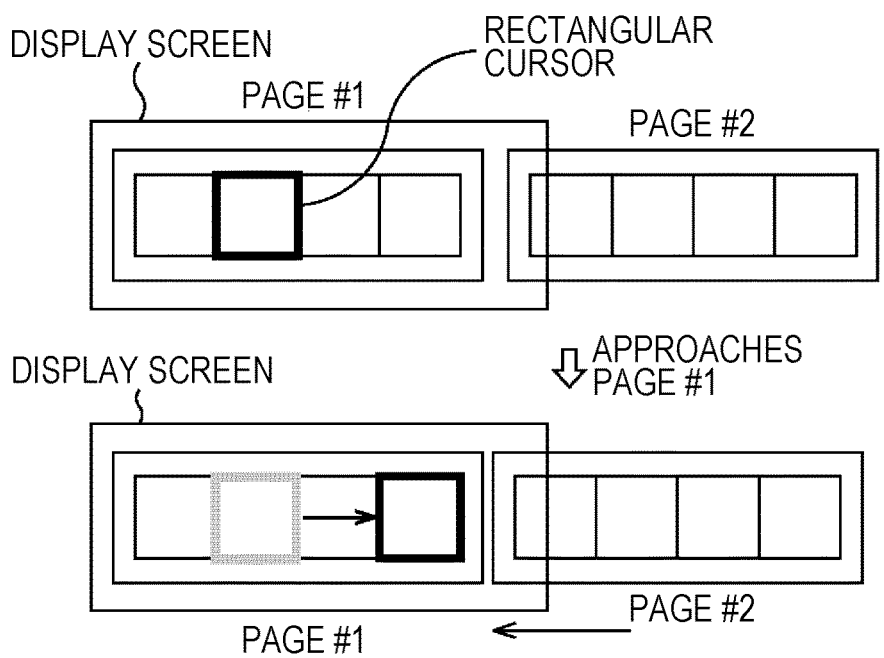
FIG. 21 is a diagram illustrating a second display example of the announcement information.

FIG. 21 is a diagram illustrating a second display example of the announcement information. Like in FIG. 20, the pages #1 and #2 exist, and the page #1 is the current page in FIG. 21.

As illustrated in FIG. 21, animating the page #2 displayed in a partial view to approach the page #1 when the rectangular cursor is positioned at the adjacent item (the item at the right end of the page #1) adjacent to the page #2 that is the adjacent page among the items in the page #1 that is the current page can be adopted as a display of the announcement information.

Besides, for example, displaying symbols such as an arrow that indicates that the adjacent page exists at an end of the display screen can be adopted as a display of the announcement information.

Furthermore, with combinations of the examples in FIG. 20 and FIG. 21, that is, both displaying change in the transmissivity of the part of the page #2 in a partial view from a light state to an intense state when the rectangular cursor is positioned at the adjacent item (the item at the right end of the page #1) adjacent to the page #2 that is the adjacent page among the items in the page #1 that is the current page and animating the page #2 displayed in a partial view to approach the page #1 can be adopted as a display of the announcement information.

The user can easily recognize that the adjacent page exists by displaying the announcement information that announces that the adjacent page exists as described above.

Movement of the Free Point Cursor

Figure 22:
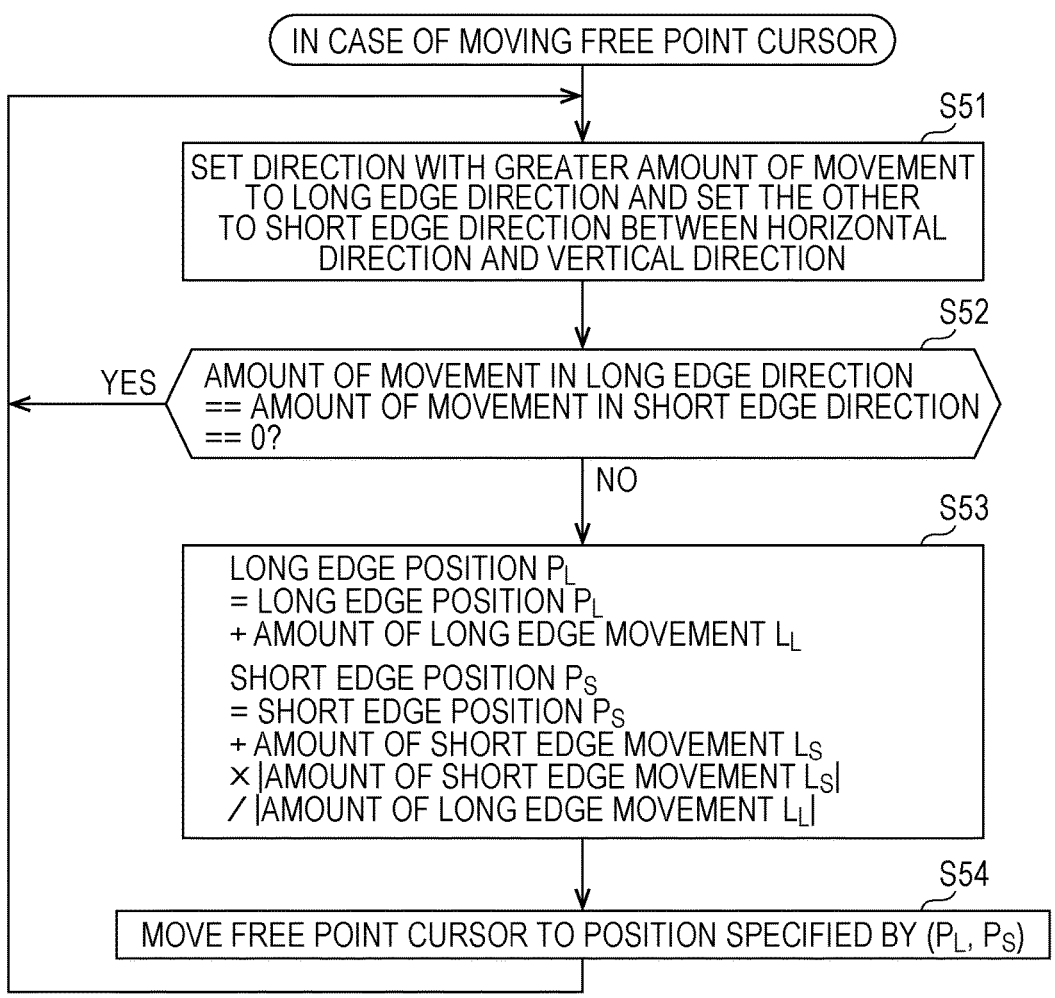
FIG. 22 is a flow chart illustrating an example of a process when moving a free point cursor in the TV.

FIG. 22 is a flow chart illustrating an example of a process when moving the free point cursor in the TV 12.

The discrete point cursor or the free point cursor is displayed in the TV 12 when necessary. The control unit 83, for example, moves the free point cursor in response to a swipe operation on the touchpad 22 when the free point cursor is displayed in the TV 12. That is, the user can move the free point cursor by swiping to operate the touchpad 22.

In addition, the user can confirm selection of a GUI where the free point cursor is positioned, call a function assigned to the GUI, or perform the like in the TV 12 by moving the free point cursor on a desired GUI such as a button displayed on the display screen and pushing or the like to operate the touchpad 22 or a push button for pushing.

The user may move the free point cursor straightly in the horizontal direction or the vertical direction, but the actual swipe operation is performed like drawing an arc even though the user intends to perform a swipe operation straightly in the horizontal direction of the vertical direction as described in FIGS. 9A to 9C when the user holds the remote controller 11 in the hand and operates the touchpad 22 with the thumb.

Accordingly, operability of the free point cursor may decrease when such a swipe operation is reflected as it is in moving the free point cursor. The control unit 83 can correct the position of the free point cursor when moving the free point cursor.

That is, in step S51, the control unit 83 sets a direction (one between the horizontal direction and the vertical direction) with the greater amount of movement to a long edge direction and sets the other direction (the other between the horizontal direction and the vertical direction) to a short edge direction between the horizontal direction and the vertical direction with the amount of movement as components of the amount of movement of the free point cursor in response to the swipe operation on the touchpad 22.

Then, the process proceeds to step S52 from step S51, and the control unit 83 determines whether all of the amount of the long edge movement $L_L$ that is the amount of movement in the long edge direction and the amount of the short edge movement $L_S$ that is the amount of movement in the short edge direction are 0.

The process returns to step S51 when all of the amount of the long edge movement $L_L$ and the amount of the short edge movement $L_S$ are determined to be 0 in step S52.

The process proceeds to step S53 when the amount of the long edge movement $L_L$ is determined not to be 0 in step S52, and the control unit 83 corrects the position of the free point cursor.

That is, the control unit 83 obtains the position of the free point cursor after correction in accordance with the expression below in step S53.

Given that $P_L$ denotes a long edge position (one between the x coordinate and the y coordinate) that is the position of the free point cursor in the long edge direction, and $P_S$ denotes a short edge position (the other between the x coordinate and the y coordinate) that is the position of the free point cursor in the short edge direction, the control unit 83 obtains the long edge position $P_L$ and the short edge position $P_S$ as the position of the free point cursor after correction in accordance with Expression 1.

$$P_L = P_L + L_L$$

$$P_S = P_S + L_S \times |L_S|/|L_L| \qquad \text{Expression 1}$$

Thereafter, the process proceeds to step S54 from step S53, and the control unit 83 moves the free point cursor to a position specified by the long edge position PL and the short edge position PS. Then, the process returns to step S51 from step S54, and thereafter, the same process is repeated.

The user is highly likely to perform a swipe operation not intended to move the free point cursor in the short edge direction but to intend to move only in the long edge direction when the difference between the amount of the long edge movement $L_L$ and the amount of the short edge movement $L_S$ is great.

According to Expression 1, the movement of the free point cursor is suppressed in the short edge direction that is the direction with the smaller amount of movement (the amount of the short edge movement $L_S$) between the amount of the horizontal movement in the horizontal direction and the amount of the vertical movement in the vertical direction of the free point cursor in response to a swipe operation on the touchpad 22. Thus, when the user performs a swipe operation not intended to move the free point cursor in the short edge direction but to move only in the long edge direction, the movement of the free point cursor is suppressed in the short edge direction. Therefore, operational sensitivity can be improved. That is, the user can easily operate the free point cursor in the intended long edge direction.

Furthermore, even when the user operates the remote controller 11 in any one of the right hand and the left hand, the same operational sensitivity can be obtained by correcting the position of the free point cursor according to Expression 1.

In addition, holding multiple contact positions on the touchpad 22 (holding the trajectory of a swipe operation) during a swipe operation or performing complex calculations is not necessary in correcting the position of the free point cursor according to Expression 1. Thus, memory used and a process load are reduced even when the correction process is embedded in any of software and hardware.

Figure 23:
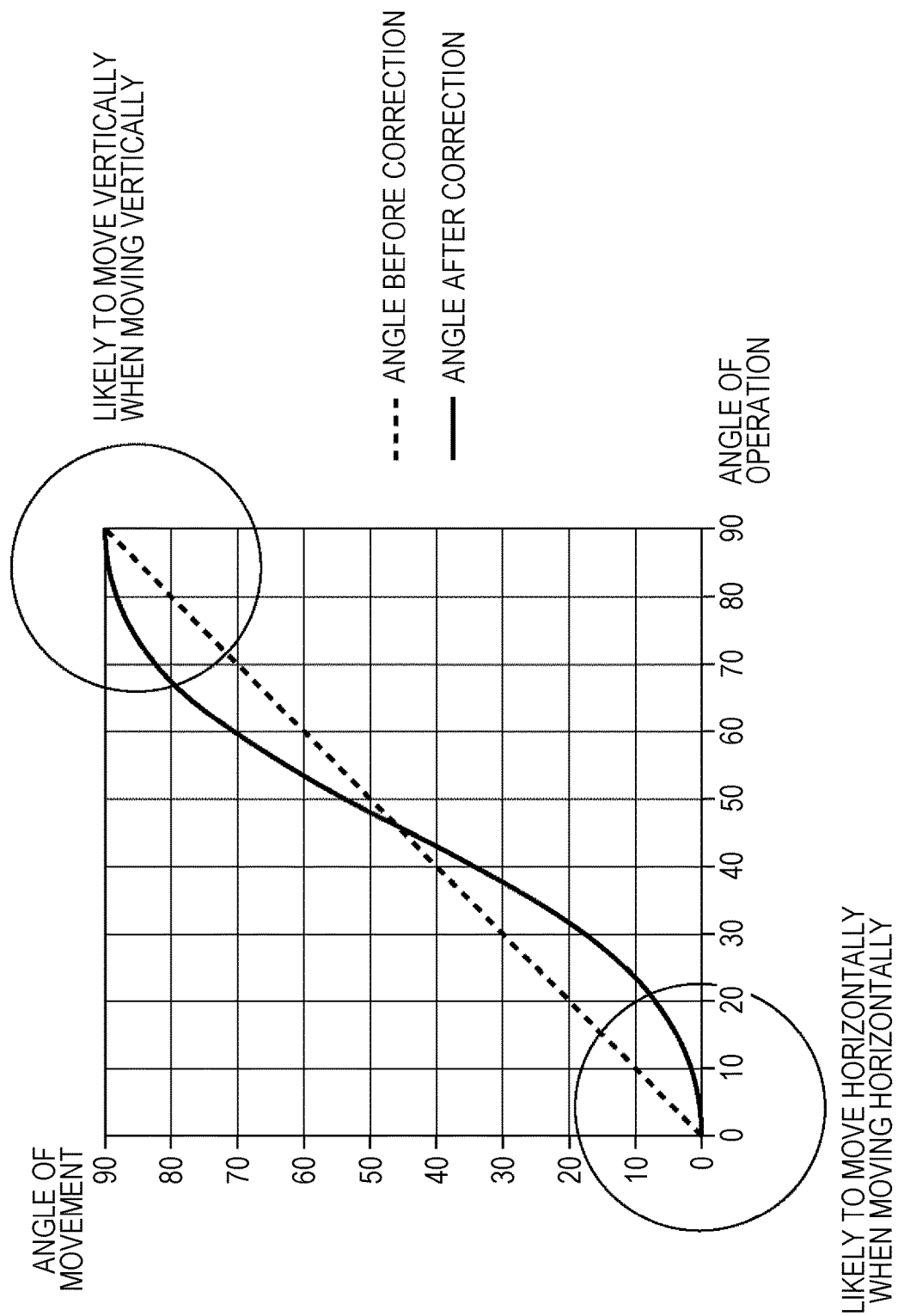
FIG. 23 is a diagram illustrating the relationship between the angle of a direction of a swipe operation (angle of operation) on the touchpad and the angle of a direction of movement (angle of movement) of the free point cursor.

FIG. 23 is a diagram illustrating the relationship between the angle that indicates the direction of a swipe operation (angle of operation) on the touchpad 22 and the angle that indicates the direction of movement (angle of movement) of the free point cursor.

In FIG. 23, the solid line illustrates the relationship between the angle of operation and the angle of movement when correcting the position of the free point cursor according to Expression 1, and the dotted line illustrates the relationship between the angle of operation and the angle of movement when not correcting the position of the free point cursor according to Expression 1.

The angle of operation and the angle of movement in FIG. 23 are angles given that the horizontal direction is 0 degrees.

It can be noticed that the free point cursor further moves in the horizontal direction during a swipe operation in a direction close to the horizontal direction (transverse direction), and the free point cursor further moves in the vertical direction during a swipe operation in a direction close to the vertical direction (perpendicular direction) according to FIG. 23.

A method for correcting the position of the free point cursor that suppresses the movement of the free point cursor in the short edge direction is not limited to the correction in accordance with Expression 1. Any methods that suppress the movement of the free point cursor in the short edge direction can be adopted as the above method.

Incidentally, as described above, the user can confirm selection of a GUI where the free point cursor is positioned, call a function assigned to the GUI, or perform the like by moving the free point cursor on a desired GUI such as a button displayed on the display screen and pushing to operate the touchpad 22 or a push button.

However, the contact position on the touchpad 22 and further the position of the free point cursor may be dislocated during the push operation. As a consequence, the push operation may be performed while the free point cursor is at a GUI that is not the desired GUI or at a position deviated from the desired GUI.

The determination unit 82 can determine whether a push operation is performed in the TV 12, and the control unit 83 can restrict the movement of the free point cursor so as not to move the free point cursor when a push operation is performed.

Restricting the movement of the free point cursor as described above when a push operation is performed can prevent the push operation from being performed while the position of the free point cursor is dislocated during the push operation, and the free point cursor is at a GUI that is not the desired GUI or at a position deviated from the desired GUI.

As a consequence, the user can be relieved from uncertainties such as the position of the free point cursor being dislocated during the push operation.

Determining whether a push operation is performed, for example, can be based on the presence of contact on the push button.

However, as for the touchpad 22, even when the touchpad 22 is contacted, determining whether the contact is for a swipe operation or the like other than a push operation or whether the contact is for a push operation is difficult.

As for the touchpad 22, the determination unit 82 can determine a push operation on the touchpad 22, for example, on the basis of one or more of a pressure on the touchpad 22, the area of a contact position where the user contacts the touchpad 22, the distance of movement on the touchpad 22 in a direction of the push operation, and the like.

The pressure on the touchpad 22, for example, can be detected by disposing a pressure sensor in the touchpad 22. The distance of movement on the touchpad 22 in the direction of the push operation, for example, can be detected by measuring the distance from a predetermined position to the touchpad 22 using a laser.

As for the touchpad 22, a push operation on the touchpad 22 is determined on the basis of one or more of the pressure on the touchpad 22, the area of a contact position where the user contacts the touchpad 22, the distance of movement on the touchpad 22 in the direction of the push operation, and the like as described above. Thus, it can be determined whether contact on the touchpad 22 is for an operation other than the push operation or whether for the push operation.

Furthermore, the free point cursor can be prevented from being dislocated even if a push operation on the touchpad 22 increases the area of a contact position on the touchpad 22, and a detection point detected as the contact position on the touchpad 22 is dislocated since the movement of the free point cursor is restricted when the push operation is performed on the touchpad 22.

Description of a Computer to which the Present Technology is Applied

The series of processes described above can be performed by hardware or can be performed by software. When the series of processes is performed by software, a program that constitutes the software is installed on a versatile computer or the like.

Figure 24:
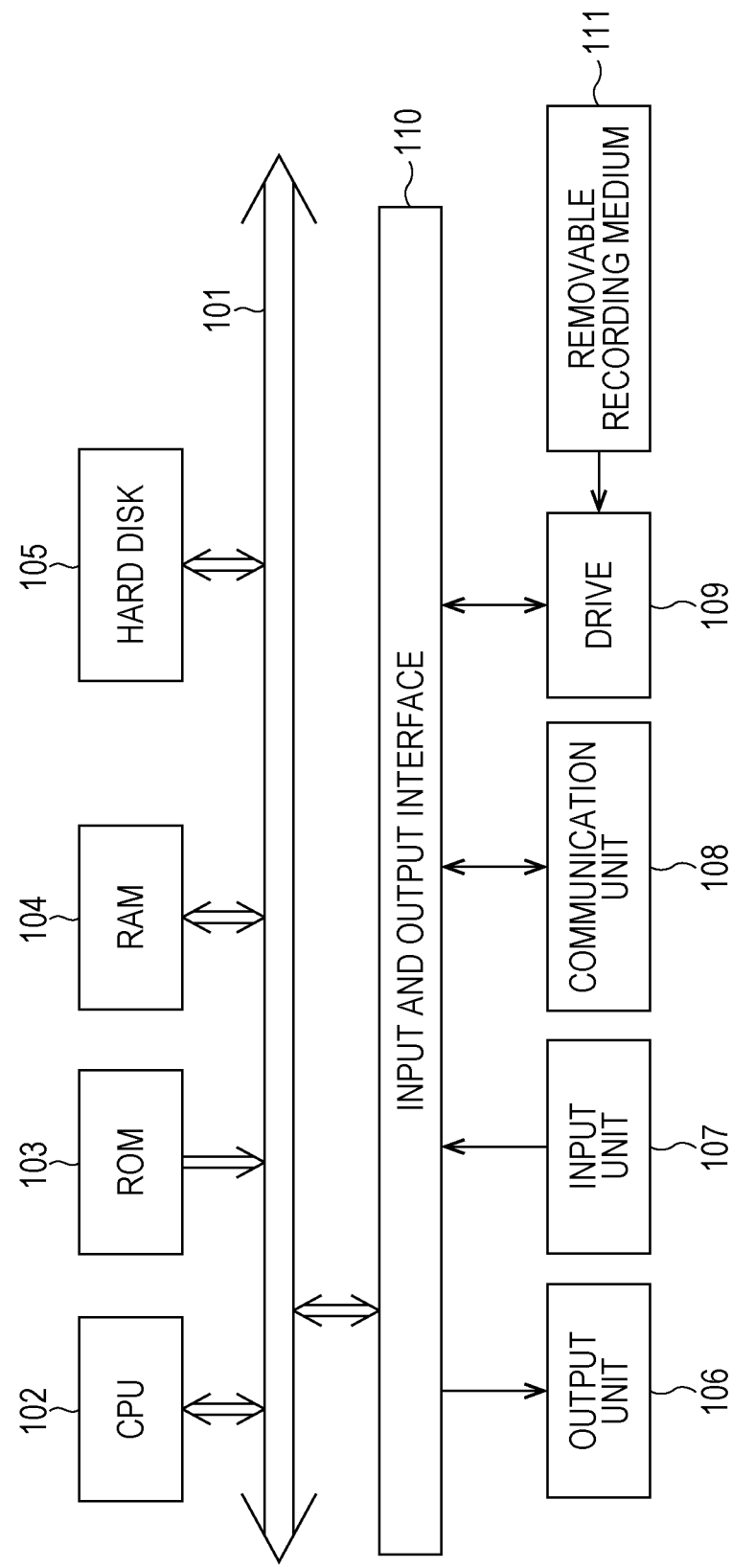
FIG. 24 is a block diagram illustrating a configuration example of an embodiment of a computer to which the present technology is applied.

FIG. 24 illustrates a configuration example of an embodiment of a computer on which the program that executes the series of processes described above is installed. The program can be recorded in advance in a hard disk 105 or a ROM 103 as a recording medium incorporated in the computer.

Alternatively, the program can be stored (recorded) in a removable recording medium 111. The removable recording medium 111 can be provided as a so-called package software. As the removable recording medium 111, for example, a flexible disk, a compact disc read-only memory (CD-ROM), a magneto-optical (MO) disk, a digital versatile disc (DVD), a magnetic disk, a semiconductor memory, or the like is used.

Besides being installed on the computer from the removable recording medium 111 as described above, the program can be downloaded on the computer through a communication network or a broadcast network and installed in the incorporated hard disk 105. That is, the program, for example, can be wirelessly transferred to the computer via a satellite for digital satellite broadcasting from a download site or can be transferred to the computer in a wired manner through a network such as a local area network (LAN) and the Internet.

The computer incorporates a central processing unit (CPU) 102. An input and output interface 110 is connected to the CPU 102 via a bus 101.

The CPU 102 executes the program stored in the read-only memory (ROM) 103 according to a command when the user operates an input unit 107 or performs the like to input the command through the input and output interface 110. Alternatively, the CPU 102 executes the program stored in the hard disk 105 after loading the program into a random access memory (RAM) 104.

Consequently, the CPU 102 performs a process according to the flow charts described above or performs a process with the configuration in the block diagram described above. Then, the process result, for example, is output from an output unit 106 through the input and output interface 110, is transmitted from a communication unit 108, or is recorded in the hard disk 105 by the CPU 102.

The input unit 107 is configured of a keyboard, a mouse, a microphone, and the like. The output unit 106 is configured of a liquid crystal display (LCD), a speaker, and the like.

In the present specification, the process performed by the computer according to the program is not necessarily performed in a time-series manner in an order described as the flow charts. That is, the process performed by the computer according to the program includes a process executed individually or in a parallel manner (for example, a parallel process or a process performed by an object).

In addition, the program may be processed by one computer (processor) or may be processed in a distributed manner by multiple computers. Furthermore, the program may be executed after being transferred to a remote computer.

In the present specification, the system means a collection of multiple constituents (devices, modules (components), and the like). It does not matter whether all the constituents are in the same case. Accordingly, multiple devices accommodated in separate cases and connected through a network and one device with multiple modules accommodated in one case are all included in the system.

Embodiments of the present technology are not limited to the embodiment described above. Various modifications may be made without departing from the gist of the present technology. For example, the present technology can have a configuration of cloud computing in which one function is divided among multiple devices through a network and is jointly processed by the multiple devices.

In addition, besides being executed by one device, each step described in the flow charts above can be divided among multiple devices and executed by the multiple devices.

Furthermore, when multiple processes are included in one step, the multiple processes included in the one step can be divided among multiple devices and executed by the multiple devices besides being executed by one device.

In the present embodiment, the remote controller 11 that includes the touchpad 22 is adopted as a device for operating the cursor. Besides, for example, an operating device that includes a sensor such as a joystick, a gyro, and an accelerometer; a portable terminal such as a communicable wearable terminal; or further a gesture (a device that recognizes a gesture and moves the cursor in response to the gesture); a line of sight (a device that detects a line of sight and moves the cursor in response to the line of sight); a biosignal (a device that detects a biosignal and moves the cursor in response to the biosignal) such as brainwaves and nerves; or others can be adopted as a device for operating the cursor.

In addition, the cursor displayed by the TV 12 is controlled in the present embodiment. Besides, the present technology can be applied to a case where, for example, a cursor displayed by an electronic apparatus other than the TV such as a recorder, a game console, and a head-mounted display is controlled.

In addition, a part or the entire of functions of the determination unit 82 in the TV 12 can be assigned to the remote controller 11.

Furthermore, the effect described in the present specification is only illustrative and is not limited. Other effects may be achieved.

The present technology can have the following configurations:

1. A control device including a control unit that displays a first cursor which discretely moves in response to an operation of a user and a second cursor which changes continuously on a display screen.
2. The control device according to 1 in which an item that is selected by the first cursor is displayed on the display screen, and the control unit continuously changes the second cursor in response to the operation of the user and moves the first cursor to an item that is positioned in the direction of change of the second cursor when the amount of change of the second cursor with the first cursor as a reference exceeds a threshold that corresponds to the size of the first cursor.
3. The control device according to 2 in which the control unit displays the second cursor only during the operation of the user.
4. The control device according to 2 or 3 in which the control unit resets the second cursor to an initial state with a predetermined event as a trigger.
5. The control device according to 4 in which the control unit resets the second cursor to the initial state with events such as the user stopping contact with a touchpad, the user not operating continuously for a predetermined time period, the first cursor being moved, and the user reversing the direction of the operation as the trigger.
6. The control device according to any one of 2 to 5 in which the item is two-dimensionally arranged and displayed, and the control unit displays the first cursor at the position of the two-dimensionally arranged item, continuously changes the second cursor in response to the operation of the user, moves the first cursor in the horizontal direction when the amount of change of the second cursor in the horizontal direction with the first cursor as a reference exceeds the threshold that corresponds to the size of the first cursor, and moves the first cursor in the vertical direction when the amount of change of the second cursor in the vertical direction with the first cursor as a reference exceeds the threshold that corresponds to the size of the first cursor.
7. The control device according to 6 in which the control unit resets the state of the second cursor in a direction orthogonal to the direction of movement of the first cursor to an initial state when the first cursor is moved.
8. The control device according to any one of 1 to 7 in which the control unit displays a cursor that is separate from the first cursor as the second cursor.
9. The control device according to any one of 1 to 7 in which the control unit integrally displays the first cursor and the second cursor.

10. A control method including displaying a first cursor that discretely moves in response to an operation of a user and a second cursor that changes continuously on a display screen.
11. A program that causes a computer to function as a control unit that displays a first cursor which discretely moves in response to an operation of a user and a second cursor which changes continuously on a display screen.
12. An electronic apparatus including a reception unit that receives an operation signal which is transmitted from a remote controller and corresponds to an operation of a user, and a control unit that displays a first cursor which discretely moves in response to the operation signal and a second cursor which changes continuously on a display screen.
13. A control device including a control unit that displays a cursor which discretely moves to the position of an item displayed on a display screen in response to an operation of a user and restricts the cursor to move up to the adjacent item when the start position of movement of the cursor is not the position of the adjacent item adjacent to the adjacent page in the direction of movement of the cursor among the items in the current page displayed on the display screen in a case where multiple pages exist.
14. The control device according to 13 in which the control unit switches the current page to the adjacent page and moves the cursor to the position of the item in the current page after page switching that is adjacent to the current page before page switching when the start position of movement of the cursor is the position of the adjacent item adjacent to the adjacent page in the direction of movement of the cursor among the items in the current page.
15. The control device according to 13 or 14 in which the control unit sets the start position of movement of the cursor to the position of the item where the direction of movement of the cursor is changed when the direction of movement of the cursor is changed.
16. The control device according to any one of 13 to 15 in which the control unit switches the current page in response to an operation in a predetermined area of a touchpad regardless of the position of the cursor.
17. The control device according to any one of 13 to 16 in which the control unit displays announcement information that announces that the adjacent page exists on the display screen when the adjacent page exists.
18. The control device according to 17 in which the control unit displays the announcement information when the cursor is positioned at the adjacent item adjacent to the adjacent page among the items in the current page.
19. A control method including displaying a cursor which discretely moves to the position of an item displayed on a display screen in response to an operation of a user and restricts the cursor to move up to the adjacent item when the start position of movement of the cursor is not the position of the adjacent item adjacent to the adjacent page in the direction of movement of the cursor among the items in the current page displayed on the display screen in a case where multiple pages exist.
20. A program that causes a computer to function as a control unit that displays a cursor which discretely moves to the position of an item displayed on a display screen in response to an operation of a user and restricts the cursor to move up to the adjacent item when the start position of movement of the cursor is not the position of the adjacent item adjacent to the adjacent page in the direction of movement of the cursor among the items in the current page displayed on the display screen in a case where multiple pages exist.

It should be understood by those skilled in the art that various modifications, combinations, sub-combinations and alterations may occur depending on design requirements and other factors insofar as they are within the scope of the appended claims or the equivalents thereof.

What is claimed is:
1. A control device, comprising:
a central processing unit (CPU) configured to:
cause display of a first cursor and a second cursor on a display screen, wherein the first cursor discretely moves based on an operation of a user, and the second cursor moves continuously on the display screen based on the operation of the user; and
move the first cursor to an item of a plurality of items positioned in a direction of movement of the second cursor, wherein the plurality of items is two-dimensionally arranged and displayed, and wherein the first cursor is displayed at a position of the item,
wherein the movement of the first cursor in a horizontal direction is based on an amount of the movement of the second cursor in the horizontal direction that exceeds a threshold, wherein the threshold is based on a size of the first cursor, and
wherein the movement of the first cursor in a vertical direction is based on the amount of the movement of the second cursor in the vertical direction that exceeds the threshold.
2. The control device according to claim 1,
wherein the CPU is further configured to
cause display of the item selected by the first cursor.
3. The control device according to claim 2, wherein the CPU is further configured to cause the display of the second cursor during the operation of the user.
4. The control device according to claim 2, wherein the CPU is further configured to change a position of the second cursor based on a determined event as a trigger.
5. The control device according to claim 4,
wherein the CPU is further configured to change the position of the second cursor based on events including at least one of a discontinued contact of the user with a touchpad, an inoperative state of the touchpad for a determined time period, the movement of the first cursor, or a reversal of direction of the operation.
6. The control device according to claim 4,
wherein the CPU is further configured to:
change the first position of the second cursor in the horizontal direction based on the movement of the first cursor in the vertical direction, and
change the position of the second cursor in the vertical direction based on the movement of the first cursor in the horizontal direction.
7. The control device according to claim 2, wherein the CPU is further configured to cause the display of a cursor separate from the first cursor as the second cursor.
8. The control device according to claim 2, wherein the CPU is further configured to cause the display of the first cursor superimposed on the second cursor.
9. A control method, comprising:
displaying a first cursor and a second cursor on a display screen, wherein the first cursor discretely moves based on an operation of a user, and the second cursor moves continuously on the display screen based on the operation of the user; and moving the first cursor to an item of a plurality of items positioned in a direction of movement of the second cursor, wherein the plurality of items is two-dimensionally arranged and displayed, and wherein the first cursor is displayed at a position of the item, wherein the movement of the first cursor in a horizontal direction is based on an amount of the movement of the second cursor in the horizontal direction that exceeds a threshold, wherein the threshold is based on a size of the first cursor, and wherein the movement of the first cursor in a vertical direction is based on the amount of the movement of the second cursor in the vertical direction that exceeds the threshold.

10. A non-transitory computer-readable medium having stored thereon, computer-executable instructions which when executed by a processor of an information processing apparatus, cause the information processing apparatus to execute operations, the operations comprising:

displaying a first cursor and a second cursor on a display screen, wherein the first cursor discretely moves based on an operation of a user, and the second cursor moves continuously on the display screen based on the operation of the user; and moving the first cursor to an item of a plurality of items positioned in a direction of movement of the second cursor, wherein the plurality of items is two-dimensionally arranged and displayed, and wherein the first cursor is displayed at a position of the item, wherein the movement of the first cursor in a horizontal direction is based on an amount of the movement of the second cursor in the horizontal direction that exceeds a threshold, wherein the threshold is based on a size of the first cursor, and wherein the movement of the first cursor in a vertical direction is based on the amount of the movement of the second cursor in the vertical direction that exceeds the threshold.

11. An electronic apparatus, comprising:

a central processing unit (CPU) configured to:

receive an operation signal transmitted from a remote controller, wherein the operation signal is based on an operation of a user;

cause display of a first cursor and a second cursor on a display screen, wherein the first cursor discretely moves based on the operation signal and the second cursor moves continuously on the display screen based on the operation signal; and move the first cursor to an item of a plurality of items positioned in a direction of movement of the second cursor, wherein the plurality of items is two-dimensionally arranged and displayed, and wherein the first cursor is displayed at a position of the item, wherein the movement of the first cursor in a horizontal direction is based on an amount of the movement of the second cursor in the horizontal direction that exceeds a threshold, wherein the threshold is based on a size of the first cursor, and wherein the movement of the first cursor in a vertical direction is based on the amount of the movement of the second cursor in the vertical direction that exceeds the threshold.

12. The control device according to claim 4, wherein the CPU is further configured to change the position of the second cursor to a center of the first cursor, wherein the position is a current position of the second cursor.

13. The control device according to claim 1, wherein the CPU is further configured to move the first cursor based on a first component in the direction of the movement of the second cursor and ignore a second component orthogonal to the direction of the movement of the second cursor.

14. The control device according to claim 4, wherein the CPU is further configured to:

cause the display of the second cursor inside the first cursor; and change the position of the second cursor inside the first cursor.

15. The control device according to claim 14, wherein the size of the first cursor remains constant based on the operation of the user to move the second cursor inside the first cursor.

16. The control device according to claim 1, wherein the CPU is further configured to ignore, from a plurality of directional components obtained from the operation of the user to move the second cursor, a component orthogonal to a direction in which the plurality of items are arranged.

17. The control device according to claim 1, wherein the CPU is further configured to stop the movement of the first cursor at an end of a current page based on a determination that the first cursor starts the movement at a position of a last item of the plurality of items in the current page.

* * * * *